(12) United States Patent
Inohiza

(10) Patent No.: US 10,912,013 B2
(45) Date of Patent: Feb. 2, 2021

(54) COMMUNICATION APPARATUS, CONTROL METHOD, AND STORAGE MEDIUM

(71) Applicant: CANON KABUSHIKI KAISHA, Tokyo (JP)

(72) Inventor: Hirohiko Inohiza, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 17 days.

(21) Appl. No.: 16/224,294

(22) Filed: Dec. 18, 2018

(65) Prior Publication Data
US 2019/0200281 A1    Jun. 27, 2019

(30) Foreign Application Priority Data
Dec. 25, 2017    (JP) .................................. 2017-248477

(51) Int. Cl.
| | |
|---|---|
| *H04L 12/26* | (2006.01) |
| *H04W 48/14* | (2009.01) |
| *H04W 8/00* | (2009.01) |
| *H04W 76/14* | (2018.01) |
| *H04W 76/10* | (2018.01) |
| *H04W 48/16* | (2009.01) |
| *H04W 84/12* | (2009.01) |
| *H04W 24/08* | (2009.01) |

(52) U.S. Cl.
CPC .......... *H04W 48/14* (2013.01); *H04W 8/005* (2013.01); *H04W 48/16* (2013.01); *H04W 76/10* (2018.02); *H04W 76/14* (2018.02); *H04W 24/08* (2013.01); *H04W 84/12* (2013.01)

(58) Field of Classification Search
CPC ..... H04W 24/10; H04W 24/00; H04W 24/02; H04W 24/08; H04W 88/08; H04W 84/12; H04L 5/0048
See application file for complete search history.

(56) References Cited

U.S. PATENT DOCUMENTS

| | | | | |
|---|---|---|---|---|
| 2011/0090833 | A1* | 4/2011 | Kneckt | H04L 12/1854 370/312 |
| 2011/0165848 | A1* | 7/2011 | Gorbachov | H04B 1/0064 455/78 |
| 2012/0179737 | A1* | 7/2012 | Baranov | H04W 76/14 709/201 |
| 2013/0077526 | A1* | 3/2013 | Yasukawa | H04L 12/2809 370/254 |
| 2013/0301438 | A1* | 11/2013 | Li | H04W 4/90 370/252 |
| 2015/0061972 | A1* | 3/2015 | Seo | H04M 1/7253 345/2.3 |
| 2016/0065667 | A1* | 3/2016 | Aoki | H04W 8/005 709/219 |
| 2018/0249512 | A1* | 8/2018 | Park | H04W 76/10 |

* cited by examiner

*Primary Examiner* — Atique Ahmed
(74) *Attorney, Agent, or Firm* — Canon U.S.A., Inc. I.P. Division

(57) ABSTRACT

A communication device selects whether to communicate with another communication device via a constructing device configured to construct a wireless network or communicate via a direct wireless interface based on a fact that the another communication device selected by a user is one redundantly detected by both a search method via the constructing device and a search method without intervention of the constructing device.

17 Claims, 15 Drawing Sheets

COMMUNICATION APPARATUS, CONTROL METHOD, AND STORAGE MEDIUM

BACKGROUND

Field

The present disclosure relates to selection of a communication method.

Description of the Related Art

The Wi-Fi® Alliance has released the Wi-Fi Miracast™ Release 2 (R2) standard in recent years. According to the Wi-Fi Miracast™ R2 standard, a transmission apparatus transmits, to a reception apparatus, image data and sound data as information about a screen being displayed and sound being reproduced by the transmission apparatus. The transmission apparatus and the reception apparatus can thereby share the screen being displayed and the sound being reproduced.

According to the Wi-Fi Miracast™ R2 standard, the transmission apparatus and the reception apparatus search for a counter device and establish wireless communication in compliance with the Wi-Fi Direct® standard (Wi-Fi® peer-to-peer (P2P) specification). The Wi-Fi Miracast™ R2 standard defines an infrastructure function for searching for a counter device and establishing wireless communication via an access point (AP).

United States Patent Application Publication No. 2016/0065667 discusses a communication device performing a search compliant with the Wi-Fi Direct® standard and a search using the infrastructure function to detect the same counter device.

If the same counter device is detected by the search compliant with the Wi-Fi Direct® standard and the search using the infrastructure function, the communication device can communicate with the detected counter device by either communication method. United States Patent Application Publication No. 2016/0065667 discusses a communication device that, when the same counter device is detected by different search methods, determines which communication method to communicate by and displays the search result based on the determination result. United States Patent Application Publication No. 2016/0065667 also discusses the user selecting a counter device to communicate with from displayed search results. Such a communication device, however, is put under an excessive processing load since the determination of the communication method is performed even on counter devices other than the one selected by the user.

SUMMARY

The present disclosure is directed to reducing the processing load of the communication device by the communication device performing processing related to selection of a communication method with another communication device according to the fact that another communication device selected by the user is one detected by a plurality of search methods.

According to an aspect of the present disclosure, a communication device includes a first communication unit configured to directly wirelessly communicate with another communication device, a second communication unit configured to communicate with another communication device via a constructing device configured to construct a wireless network, a first search unit configured to search, without intervention of the constructing device, for another communication device to communicate with via the first communication unit, a second search unit configured to search, via the constructing device, for another communication device to communicate with via the second communication unit, a first acceptance unit configured to accept a user operation for selecting another communication device to communicate with via the first communication unit or the second communication unit from among other communication devices detected by at least a search by the first search unit or a search by the second search unit, a selection unit configured to select whether to communicate with the another communication device via the first communication unit or via the second communication unit based on one or more of a state of communication with the another communication device, information about the communication device, and information about the another communication device, based on a fact that the another communication device selected by the user operation is one redundantly detected by the search by the first search unit and the search by the second search unit, and a control unit configured to perform control to communicate with the another communication device selected by the user operation via the first communication unit or via the second communication unit selected by the selection unit.

According to another aspect of the present disclosure, a communication device includes a first communication unit configured to directly wirelessly communicate with another communication device, a second communication unit configured to communicate with another communication device via a constructing device configured to construct a wireless network, a first search unit configured to search, without intervention of the constructing device, for another communication device to communicate with via the first communication unit, a second search unit configured to search, via the constructing device, for another communication device to communicate with via the second communication unit, a first acceptance unit configured to accept a first user operation for selecting another communication device to communicate with via the first communication unit or the second communication unit from among other communication devices detected by at least a search by the first search unit or a search by the second search unit, and a notification unit configured to, in a case where a user selects which of the first communication unit or the second communication unit to communicate with the another communication device selected by the first user operation, provide a notification based on one or more of a state of communication with the another communication device, information about the communication device, and information about the another communication device based on a fact that the another communication device is one redundantly detected by the search by the first search unit and the search by the second search unit.

Further features of the present disclosure will become apparent from the following description of exemplary embodiments with reference to the attached drawings.

DESCRIPTION OF THE EMBODIMENTS

Exemplary embodiments will be described in detail below with reference to the accompanying drawings. Configurations described in the following exemplary embodiments are just examples, and the present disclosure is not limited to the following configurations.

Figure 1:
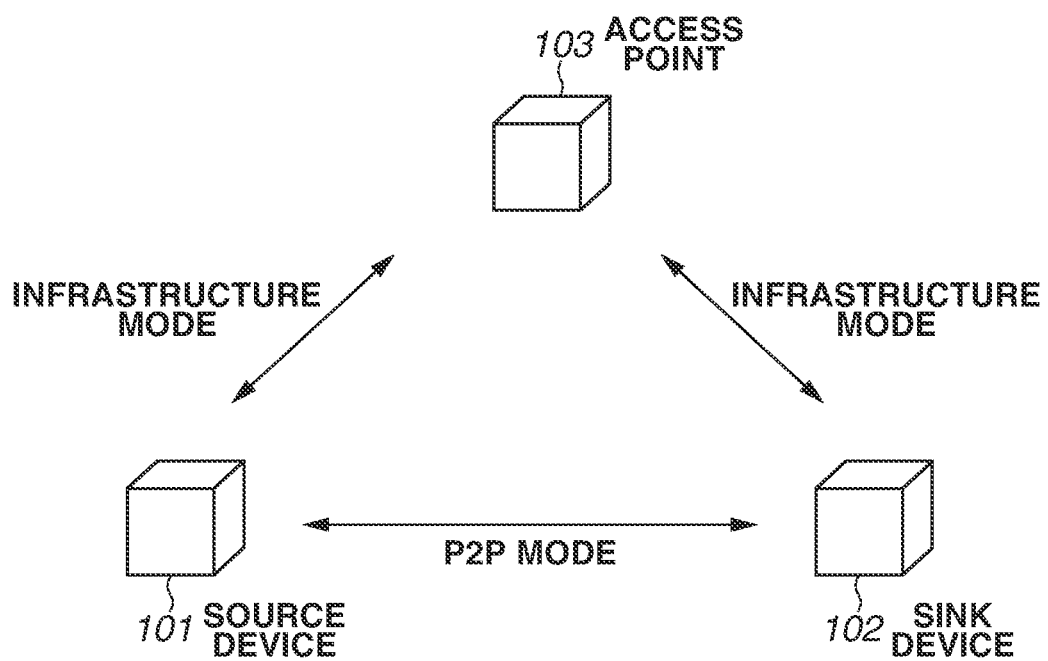
FIG. 1 is a diagram illustrating a configuration of a network in which a source device participates.

FIG. 1 illustrates a configuration of a network in which a source device 101 according to a first exemplary embodiment participates. Apparatuses in FIG. 1 perform communication by a wireless communication method compliant with the Institute of Electrical and Electronics Engineers (IEEE) 802.11 series standard.

The source device 101 performs wireless communication with a sink device 102 via an AP 103 on an infrastructure network which is a wireless network compliant with the IEEE 802.11 series standard. Such a mode of communication will be referred to as an infrastructure mode. The source device 101 can also perform wireless communication compliant with the Wi-Fi Direct® standard with the sink device 102. Such a mode of communication will be referred to as a P2P mode. The source device 101 and the sink device 102 communicate directly without the intervention of the AP 103.

In addition to the wireless communication compliant with the IEEE 802.11 series standard, the apparatuses can use wireless communication compliant with other wireless communication methods such as Bluetooth®, near-field communication (NFC), ultra-wideband (UWB), ZigBee®, and MultiBand Orthogonal frequency-division multiplexing (OFDM) Alliance (MBOA). UWB includes wireless Universal Serial Bus (USB), wireless 1394, and WiNet. A communication method compliant with a wired communication method such as a wired local area network (LAN) can be used.

The source device 101 (transmission apparatus) according to the present exemplary embodiment is compliant with the Wi-Fi Miracast™ R2 standard, and shares a screen being displayed and sound being reproduced with the sink device 102 (reception apparatus). Specifically, the transmission apparatus (source device 101) transmits, to the reception apparatus (sink device 102) via a network, image data and sound data as information about a screen being displayed and sound being reproduced by the transmission apparatus (source device 101). The transmission apparatus (source device 101) and the reception apparatus (sink device 102) thereby share the screen being displayed and the sound being reproduced. Such an operation is referred to as mirroring. When the source device 101 and the sink device 102 perform mirroring, the screen being displayed and the sound being reproduced by the source device 101 are shared between the source device 101 and the sink device 102.

Specific examples of the source device 101 include a tablet, a smartphone, a personal computer (PC), a mobile phone, and image input apparatuses such as a camera and a video camera. However, the source device 101 is not limited thereto, and any apparatus satisfying a hardware configuration and a module configuration as described below can be used. The source device 101 can be any communication device that can transmit at least a screen being displayed or sound being reproduced by the apparatus to another communication device.

Specific examples of the sink device 102 include a tablet, a smartphone, a PC, a mobile phone, a television set, a television adapter, a set top box, and a head-mounted display. Specific examples of the sink device 102 also include a projector, a display, and a car navigation system. The sink device 102 is not limited thereto, and any apparatus satisfying a hardware configuration and a module configuration as described below can be used. The sink device 102 can be any communication device that can receive and reproduce at least a screen being displayed or sound being reproduced by another communication device.

Since the source device 101 is compliant with the Wi-Fi Miracast™ R2 standard, the source device 101 can perform mirroring via an infrastructure network in addition to mirroring via a network compliant with the Wi-Fi Direct® standard. The same applies to the sink device 102.

A case where the source device 101 and the sink device 102 perform mirroring via the network compliant with the Wi-Fi Direct® standard (mirroring in the P2P mode) will be described. In mirroring based on the Wi-Fi Direct® standard, the source device 101 directly transmits (streams), to the sink device 102 via the network, a stream of image data and sound data as information about a screen being displayed and sound being reproduced. The image data is obtained by encoding the screen being displayed on the source device 101. The sound data is obtained by encoding the sound being reproduced by the source device 101. The sink device 102 receives the stream of the image data and the sound data, and reproduces the image data and the sound data in synchronization with the source device 101. In other words, the source device 101 and the sink device 102 under mirroring share the screen being displayed and the sound being reproduced.

A case where the source device 101 and the sink device 102 perform mirroring via the infrastructure network (mirroring in the infrastructure mode) will be described. In mirroring via the infrastructure network, the source device 101 transmits a stream of image data and sound data to the sink device 102 via the AP 103. The sink device 102 receives the stream of the image data and the sound data via the AP 103, and reproduces the image data and the sound data in synchronization with the source device 101.

The source device 101 and the sink device 102 can perform content redirection via the network compliant with the Wi-Fi Direct® standard or the infrastructure network in addition to or instead of mirroring. In content redirection, the source device 101 makes the sink device 102 obtain data from an external apparatus other than the source device 101, and makes the sink device 102 reproduce the data. Here, the source device 101 transmits information needed to make the sink device 102 obtain the data from the external apparatus. An example of the data for the sink device 102 to obtain is contents, which include image data, document data, sound data, or video data. One or more of software data, graphical user interface (GUI) data, and meta data for reproducing the data can also be included.

The information that the source device 101 transmits to the sink device 102 is related information about the contents on the external apparatus. Examples of the related information about the contents include information such as an identifier for identifying the contents on the external apparatus, a service name, location information (Uniform Resource Identifier (URI) or Uniform Resource Locator (URL)) about the contents, and a reproduction start time (offset). The related information about the contents to be received may be part of such pieces of information. The identifier of the contents is one for uniquely identifying the contents.

The source device 101 and the sink device 102 can perform direct streaming via the network compliant with the Wi-Fi Direct® standard or the infrastructure network in addition to or instead of mirroring. In direct streaming, the source device 101 transmits data stored in the source device 101 to the sink device 102. The sink device 102 receives and reproduces the data. In such a case, the source device 101 can transmit the data of the original coding method to the sink device 102 without decoding or recoding. An example of the data for the sink device 102 to receive is contents.

In FIG. 1, the Wi-Fi Miracast™ R2 standard is used as the communication method for performing mirroring between the source device 101 and the sink device 102. However, the communication method is not limited to the Wi-Fi Miracast™ R2 standard, and another communication method such as Intel® Wireless Display (Intel® WiDi) or Apple® AirPlay® can be used. Specifically, any communication method capable of wireless communication corresponding to at least one of the foregoing mirroring, content redirection, and direct streaming can be used. According to the Wi-Fi Miracast™ R2 standard, the source device 101 performs mirroring via the network compliant with the Wi-Fi Direct® standard or the infrastructure network. However, this is not restrictive, and an application service platform (ASP) can be used.

Figure 2:
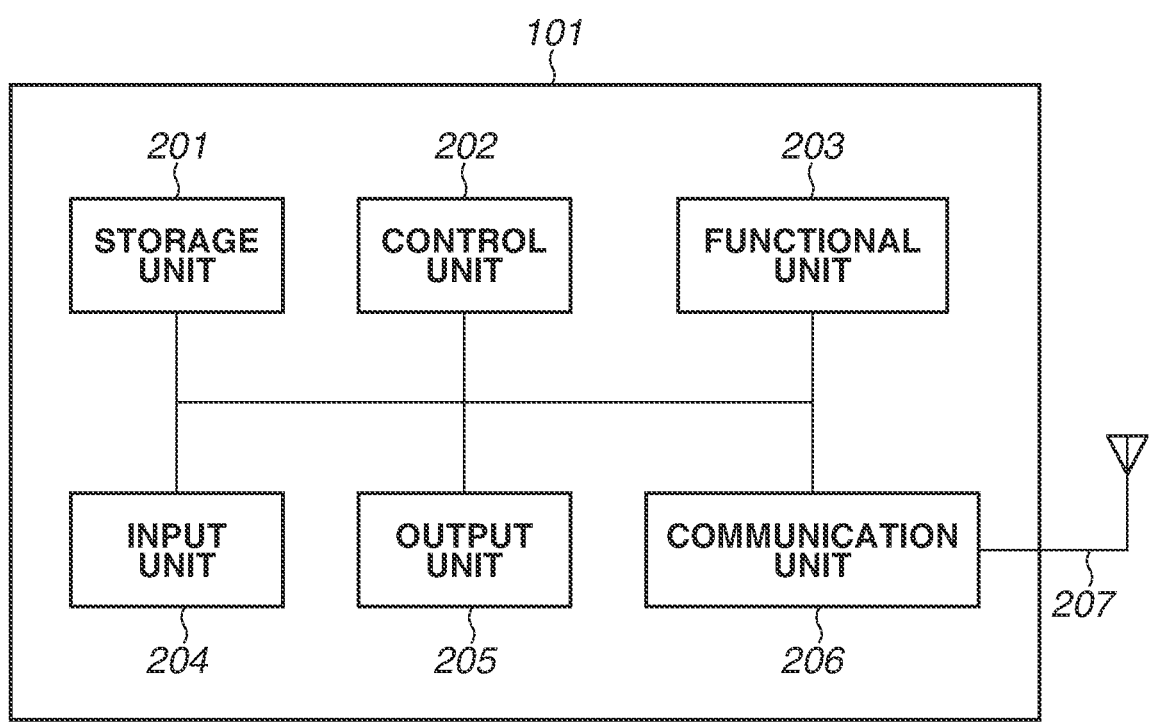
FIG. 2 is a diagram illustrating a hardware configuration of the source device.

FIG. 2 illustrates a hardware configuration of the source device 101.

The source device 101 includes a storage unit 201, a control unit 202, a functional unit 203, an input unit 204, an output unit 205, a communication unit 206, and an antenna 207.

The storage unit 201 includes one or more memories such as a read-only memory (ROM) and a random access memory (RAM). The storage unit 201 stores a computer program for performing various operations described below, and various types of information such as a communication parameter for wireless communication. Aside from memories like a ROM and a RAM, the storage unit 201 can use storage media such as a flexible disk, a hard disk, an optical disk, a magneto-optical disk, a Compact Disc Read-Only Memory (CD-ROM), a Compact Disk-Recordable (CD-R), a magnetic tape, a nonvolatile memory card, and a digital versatile disk (DVD). The storage unit 201 can include a plurality of memories.

The control unit 202 includes one or more processors such as a central processing unit (CPU) and a microprocessing unit (MPU) which function(s) as a computer. The control unit 202 controls the entire source device 101 by executing the computer program stored in the storage unit 201. The control unit 202 can control the entire source device 101 via cooperation of the program stored in the storage unit 201 and an operating system (OS). The control unit 202 can include a plurality of processors like a multicore processor, and control the entire source device 101 by the plurality of processors.

The control unit 202 implements a P2P search function and an infrastructure search function by executing the computer program stored in the storage unit 201. As employed herein, the P2P search function refers to a function by which the source device 101 searches for a counter device which is a partner device to perform mirroring with via wireless communication compliant with the Wi-Fi Direct® standard. In other words, the P2P search function is a function of searching for a counter device in the P2P mode. The infrastructure search function refers to a function by which the source device 101 searches for a counter device that is a partner apparatus to perform mirroring with via the infrastructure network. In other words, the infrastructure search function is a function of searching for a counter device in the infrastructure mode. The source device 101 can search for a counter device to perform content redirection or direct streaming with in addition to or instead of mirroring.

By executing the computer program stored in the storage unit 201, the control unit 202 implements a function of selecting a method for communicating with another communication device detected by a search using the P2P search function and/or a search using the infrastructure search function. The communication method to be selected here is either a communication method for performing communication in compliance with the Wi-Fi Direct® standard (performing communication in the P2P mode) or a communication method for performing communication via the infrastructure network (performing communication in the infrastructure mode). The source device 101 performs communication by the communication method selected by the selection function when communicating with another communication device redundantly detected by a search using the P2P search function and a search using the infrastructure search function.

The selection function can be configured to simply select a communication method to be recommended. In such a case, the source device 101 notifies its user of the communication method selected by the selection function if another communication device is redundantly detected by a search using the P2P search function and a search using the infrastructure function. The user then determines which communication method the source device 101 communicates with another communication device by.

The selection of the communication method by the selection function is determined based on the state of communication to be performed by the source device 101 in the P2P mode and the state of communication to be performed by the source device 101 in the infrastructure mode. Examples of the state of communication here include quality of the communication to be performed by the source device 101 in the P2P mode or the infrastructure mode, and a frequency band to be used. The selection of the communication method by the selection function can be performed based on information about the source device 101. Specifically, the information about the source device 101 refers to capability information about the source device 101. An example of the capability information about the source device 101 is whether the source device 101 can perform content redirection. The information about the source device 101 can be state information about the source device 101. An example of the state information about the source device 101 is whether the source device 101 is running an application that uses the infrastructure mode. The selection of the communication method by the selection function can be performed based on information about the sink device 102.

The control unit 202 implements a mirroring function as a source device by executing the computer program stored in the storage unit 201. As employed herein, the mirroring function as a source device refers to a function of transmitting, to a sink device, image data obtained by capturing and encoding a screen being displayed on the apparatus and sound data obtained by encoding sound being reproduced. The control unit 202 can implement a content redirection function and/or a direct streaming function in addition to or instead of the mirroring function as a source device by executing the computer program stored in the storage unit 201. The content redirection function as a source device is a function of transmitting, to a sink device, information needed for the sink device to obtain contents to be reproduced by the sink device from an external apparatus other than the source device. The direct streaming function as a source device is a function of transmitting contents stored in the storage unit 201 to a sink device.

The control unit 202 controls the functional unit 203 to perform predetermined processing such as imaging and content browsing. The functional unit 203 is hardware for the source device 101 to perform the predetermined processing. For example, if the source device 101 is a camera, the functional unit 203 is an imaging unit and performs imaging processing. Here, the source device 101 can perform mirroring by displaying data generated by the imaging unit on screen by using the output unit 205 described below, and transmitting the data to another communication device by the mirroring function of the control unit 202. The source device 101 can display data stored in the storage unit 201 of the source device 101 on screen by using the output unit 205, and similarly perform mirroring.

The input unit 204 accepts various operations from the user. The output unit 205 provides various outputs to the user via a monitor screen and a speaker. The outputs of the output unit 205 can include a display on the monitor screen, a sound output from the speaker, and a vibration output. The monitor screen to which the output unit 205 provides an output is that of the source device 101. The monitor screen can be that of another apparatus connected to the source device 101. Both the input unit 204 and the output unit 205 can be implemented by a single module like a touch panel. The input unit 204 and the output unit 205 can both be separate from the source device 101.

The communication unit 206 performs control on wireless communication compliant with the IEEE 802.11 series standard, control on wired communication by a wired LAN, and control on Internet Protocol (IP) communication. The communication unit 206 transmits and receives wireless signals for wireless communication via the antenna 207 based on the communication method selected by the selection function. The source device 101 communicates contents such as image data, document data, and video data with the sink device 102 via the communication unit 206. The source device 101 can switch and perform searches and communications for/with a counter device in the P2P mode and the infrastructure mode in a time-division manner, or perform both at the same time, depending on functions supported by a communication chip that is used as the communication unit 206.

The sink device 102 has a hardware configuration similar to that of the source device 101. A storage unit 201, a functional unit 203, an input unit 204, an output unit 205, a communication unit 206, and an antenna 207 of the sink device 102 are similar to those of the source device 101. A description thereof will thus be omitted herein.

A control unit 202 of the sink device 102 includes one or more processors such as a CPU and an MPU. The control unit 202 controls the entire sink device 102 by executing a computer program stored in the storage unit 201. The CPU and the MPU function as a computer. The control unit 202 can control the entire sink device 102 via cooperation of the computer program stored in the storage unit 201 and an OS. The control unit 202 can include a plurality of processors like a multicore processor, and control the entire sink device 102 by the plurality of processors.

The control unit 202 implements a P2P search function and an infrastructure search function by executing the computer program stored in the storage unit 201. The P2P search function is a function by which the sink device 102 searches for a counter device that is a partner apparatus to perform mirroring with via wireless communication compliant with the Wi-Fi Direct® standard. In other words, the P2P search function is a function of searching for a counter device in the P2P mode. The infrastructure search function is a function by which the sink device 102 searches for a counter device that is a partner apparatus to perform mirroring with via the infrastructure network. In other words, the infrastructure search function is a function of searching for a counter device in the infrastructure mode. The sink device 102 can search for a counter device to perform content redirection or direct streaming with in addition to or instead of mirroring.

By executing the computer program stored in the storage unit 201, the control unit 202 implements a function of selecting a method for communicating with another communication device detected by a search using the P2P search function and a search using the infrastructure search function. The communication method selected here is either a communication method for performing communication in compliance with the Wi-Fi Direct® standard (performing communication in the P2P mode) or a method for performing communication via the infrastructure network (performing communication in the infrastructure mode). The sink device 102 performs communication by the communication method selected by the selection function when communicating with another communication device redundantly detected by a search using the P2P search function and a search using the infrastructure search function.

The selection function can be configured to simply select a communication method to be recommended. In such a case, the sink device 102 notifies its user of the communication method selected by the selection function if another communication device is redundantly detected by a search using the P2P search function and a search using the infrastructure search function. The user then determines which communication method the sink device 102 communicates with another communication device by.

The control unit 202 implements a mirroring function as a sink device by executing the computer program stored in the storage unit 201. As employed herein, the mirroring function as a sink device refers to a function of receiving, decoding, and reproducing image data obtained by capturing and encoding a screen being displayed on a source device and sound data obtained by encoding sound being reproduced by the source device. The control unit 202 can implement a content redirection function and/or a direct streaming function in addition to or instead of the mirroring function as a sink device by executing the computer program stored in the storage unit 201. The content redirection function as a sink device is a function of obtaining contents to be reproduced from an external apparatus other than a source device based on information transmitted from the source device, and reproducing the contents. The direct streaming function as a sink device is a function of receiving and reproducing contents transmitted from a source device.

The source device 101 and the sink device 102 can both display an image and reproduce sound. Both the source device 101 and the sink device 102 can be devices that just display an image or reproduce sound.

Figure 3:
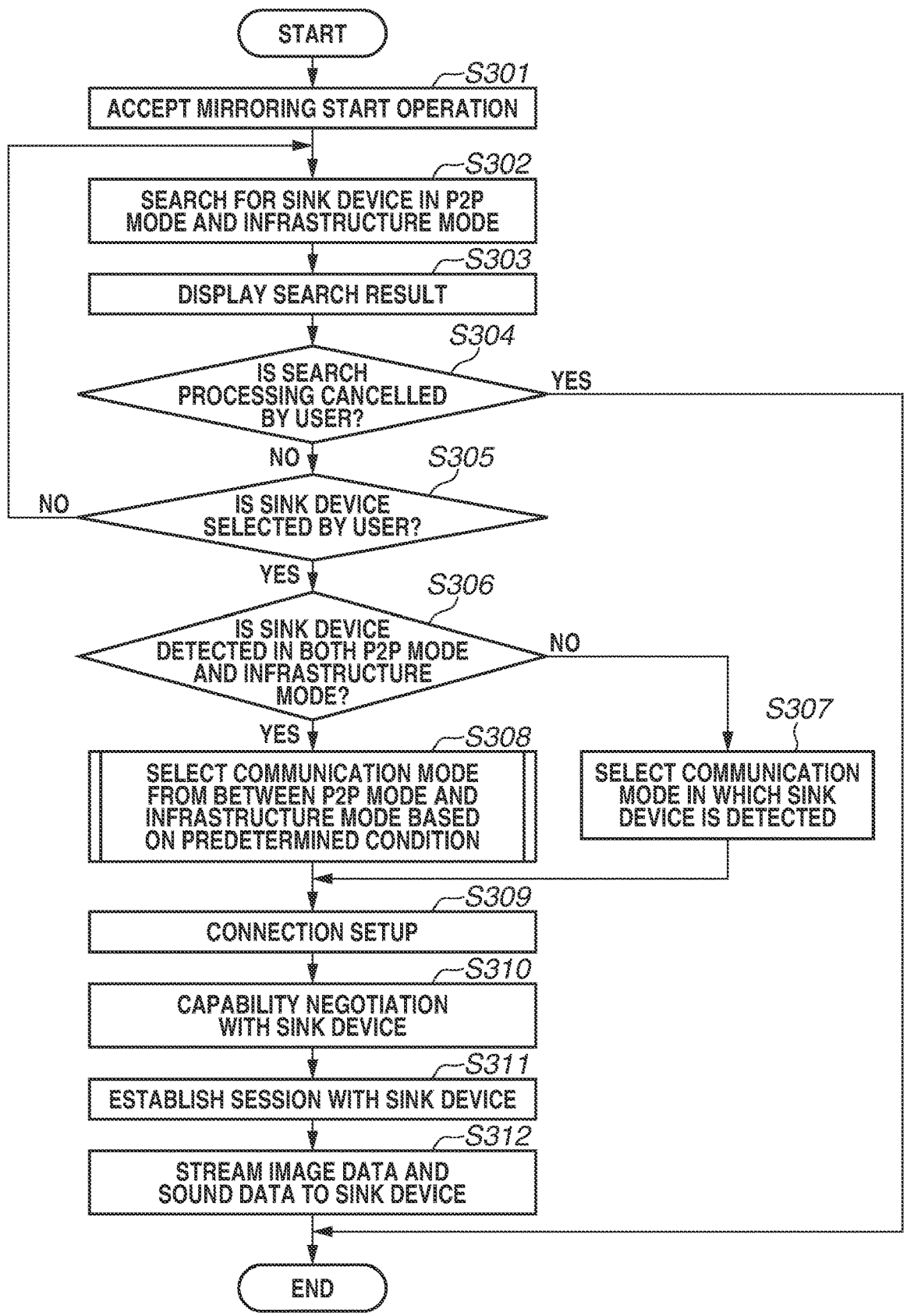
FIG. 3 is a flowchart illustrating processing performed when the source device searches for a sink device and performs mirroring.

FIG. 3 illustrates a flowchart of processing implemented by the control unit 202 of the source device 101 reading and executing the computer program stored in the storage unit 201 when the source device 101 searches for the sink device 102 and starts mirroring.

In the present flowchart, the source device 101 searches for a counter device to perform mirroring with. However, this is not restrictive, and the sink device 102 can search for a counter device to perform mirroring with.

At least part of the flowchart in FIG. 3 can be implemented by hardware. In the case of hardware configuration, for example, a dedicated circuit can be automatically generated on a field programmable gate array (FPGA) from the computer program for implementing the steps, by using a predetermined complier. Like an FPGA, a gate array circuit can be formed for hardware implementation. An application specific integrated circuit (ASIC) can be used for hardware implementation.

The processing of the present flowchart is started based on activation of a predetermined application that performs mirroring, on the source device 101. The processing of the present flowchart can be started based on power-on of the source device 101. The processing of the present flowchart can be started based on participation of the source device 101 in the infrastructure network constructed by the AP 103. The processing of the present flowchart can be started based on the fact that the source device 101 and the sink device 102 establish a network compliant with the Wi-Fi Direct® standard.

In step S301, the control unit 202 of the source device 101 initially accepts a mirroring start operation from the user. An example of the mirroring start operation made by the user in the present step is pressing of a mirroring start button displayed on the monitor screen of the source device 101. However, this is not restrictive. A user operation such as a predetermined keyboard operation, mouse operation, touch operation, or joystick operation can be used as the mirroring start operation. A user operation such as a predetermined gesture, pressing of a control button of a remote controller, a start of reproduction of predetermined contents, or activation of a predetermined application can be used as the mirroring start operation.

In step S302, the control unit 202 of the source device 101 searches for the sink device 102 in the P2P mode and the infrastructure mode. Specifically, the control unit 202 of the source device 101 searches for a counter device to perform mirroring with by using the P2P search function and the infrastructure search function. In the present step, the control unit 202 of the source device 101 searches for the sink device 102 by performing a search in the P2P mode and a search in the infrastructure mode in parallel. The source device 101 switches and performs the searches in the two modes in a time-division manner as illustrated in the sequence diagrams of FIGS. 6 and 7 described below based on the functions supported by the communication chip used as the communication unit 206. The source device 101 can simultaneously perform the searches in the two modes as illustrated in the sequence diagram of FIG. 8 based on the functions supported by the communication chip used as the communication unit 206. In the present step, the source device 101 can perform the search for the sink device 102 in the P2P mode and the search for the sink device 102 in the infrastructure mode in order. In such a case, the order in which the source device 101 performs the search for the sink device 102 in the P2P mode and the search for the sink device 102 in the infrastructure mode is optional.

The search for the sink device 102 in the P2P mode is performed by transmitting and receiving frames such as a Beacon, a Probe Request, and a Probe Response in compliance with the Wi-Fi Miracast™ R2 standard. Each frame includes an information element called Wi-Fi® Display information element (WFD IE) which includes sub elements such as device information. For example, the source device 101 transmits a Beacon, a Probe Request, or a Probe Response including a WFD IE which includes a sub element indicating that the own apparatus is a source device. If an apparatus transmitting a Beacon, a Probe Request, or a Probe Response is a sink device, the apparatus transmits a WFD IE including a sub element indicating that the own apparatus is a sink device. If an apparatus transmitting a Beacon, a Probe Request, or a Probe Response can play both the role as a source device and the role as a sink device, the apparatus transmits a WFD IE including a sub element indicating that the own apparatus is a dual role device.

The search in the infrastructure mode is performed by a multicast Domain Name System (multicast DNS or mDNS) in compliance with the Wi-Fi Miracast™ R2 standard. Specifically, the source device 101 performs the search by multicasting a DNS packet to other communication devices participating in the infrastructure network via the AP 103 to which the source device 101 is connected. The source device 101 receives a response from a counter device capable of mirroring via the AP 103, thereby detecting the counter device.

Specifically, the source device 101 transmits, via the AP 103, a DNS packet including DNS records such as a pointer (PTR) record, a service (SRV) record, and a text (TXT) record. The DNS records indicate that the source device 101 is searching for a specific communication device that can perform wireless communication compliant with the Wi-Fi Miracast™ R2 standard. Specifically, the DNS records include either service names "displaysrc" or "display". The service name "displaysrc" represents a source device. The service name "display" represents a sink device. Since the source device 101 searches for the sink device 102 as a counter device to perform mirroring with, the DNS records include "display", which represents a sink device 102.

The source device 101 can transmit the DNS packet at arbitrary transmission intervals for an arbitrary number of times of transmission. When searching for a counter device, the source device 101 repeatedly transmits the DNS packet up to a predetermined number of times. The source device 101 can repeatedly transmit the DNS packet until a predetermined time elapses. The source device 101 can stop transmitting the DNS packet based on reception of responses from a predetermined number of counter devices.

Figure 5:
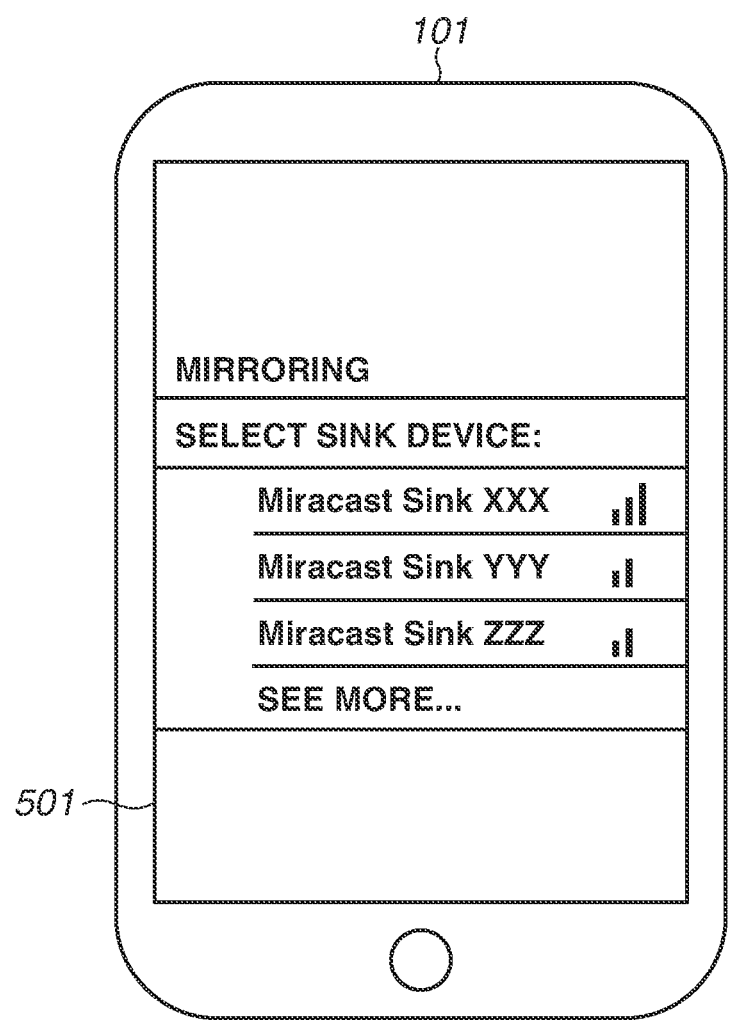
FIG. 5 is a diagram illustrating an example of a display screen of search results of sink devices by the source device.

In step S303, after the search processing of a counter device in the P2P mode and the infrastructure mode, the control unit 202 of the source device 101 displays the search result. FIG. 5 is a diagram illustrating an example of a display screen that the source device 101 displays as a result of search for the sink device 102. A search result screen 501 displays device names as information about sink devices 102 detected in step S302. The search result screen 501 can display information about communication quality as information about the sink devices 102 detected in step S302. In such a case, the source device 101 obtains the communication quality between the source device 101 and the sink devices 102 when the sink devices 102 are searched for in step S302. The acquisition of communication quality by the source device 101 will be described below in step S308. The source device 101 can display communication modes (P2P mode or infrastructure mode) available for communication with the sink devices 102 on the search result screen 501.

The search result screen 501 is displayed at timing when a counter device is detected. Specifically, in searching for a counter device in step S302, the control unit 202 of the source device 101 displays the search result screen 501 before ending a search, and searches for a counter device in parallel with the display of the search result screen 501. The display of the search result screen 501 is updated at timing when a new counter device is detected. The search result screen 501 can be regularly updated at predetermined time intervals. Counter devices can be listed on the search result screen 501 in order of detection, in descending order of field intensity, or in ascending order of distance from the source device 101.

The control unit 202 of the source device 101 can display the search result screen 501 after the end of a search for a counter device in step S302.

In step S304, the control unit 202 of the source device 101 determines whether the search processing is cancelled by the user. If the search processing is determined to be cancelled by the user (YES in step S304), the control unit 202 of the source device 101 discontinues the search processing and the processing of the present flowchart ends. If the search processing is determined not to be cancelled by the user (NO in step S304), the processing proceeds to step S305.

In step S305, the control unit 202 of the source device 101 determines whether a specific sink device is selected by the user from among the detected sink devices. In the present step, the user does not need to select a communication mode in connecting to the specific sink device. The determination is made based on whether the user selects a specific sink device from the list of sink devices displayed on the search result screen 501 within a predetermined time. If a specific sink device is determined to be selected by the user within a predetermined time (YES in step S305), the processing proceeds to step S306. If no specific sink device is determined to be selected by the user within a predetermined time (NO in step S305), the processing returns to step S302.

If the user selects "see more" on the search result screen 501, the control unit 202 of the source device 101 can determine that no specific sink device is selected. If there is a display for attempting a search for a sink device again, like "search again", on the search result screen 501 and the display is selected by the user, the control unit 202 of the source device 101 can determine that no specific sink device is selected.

Aside from the presence or absence of the user's operation for selecting a sink device, the control unit 202 of the source device 101 can make the determination based on, for example, whether a sink device connected in the past is included in the search results of sink devices. Specifically, the control unit 202 of the source device 101 compares a connection history of sink devices stored in the storage unit 201 with the search results, and if there is a sink device that matches, determines that the sink device is selected. If there is no matching sink device between the connection history of sink devices stored in the storage unit 201 and the search results, the control unit 202 of the source device 101 can determine that no sink device is selected. The determination of the present step can be made by using such conditions in combination.

In step S306, the control unit 202 of the source device 101 determines whether the sink device 102 selected in step S305 is detected in both the P2P mode and the infrastructure mode in step S302. If the selected sink device 102 is not detected in both the P2P mode and the infrastructure mode (NO in step S306), the processing proceeds to step S307. The case where the selected sink device 102 is not detected in both the P2P mode and the infrastructure mode refers to when the selected sink device 102 is detected in just either of the communication modes, i.e., the P2P mode or the infrastructure mode. If the sink device 102 selected in step S306 is detected in both the P2P mode and the infrastructure mode (YES in step S306), the processing proceeds to step S308.

In step S307, the control unit 202 of the source device 101 selects to perform mirroring in the communication mode in which the selected sink device 102 is detected. The processing then proceeds to step S309.

In step S308, the control unit 202 of the source device 101 performs processing for selecting which communication mode to perform mirroring with the selected sink device 102, the P2P mode or the infrastructure mode, based on a predetermined condition. The processing performed by the control unit 202 of the source device 101 in step S308 will be described with reference to FIG. 4.

Figure 4:
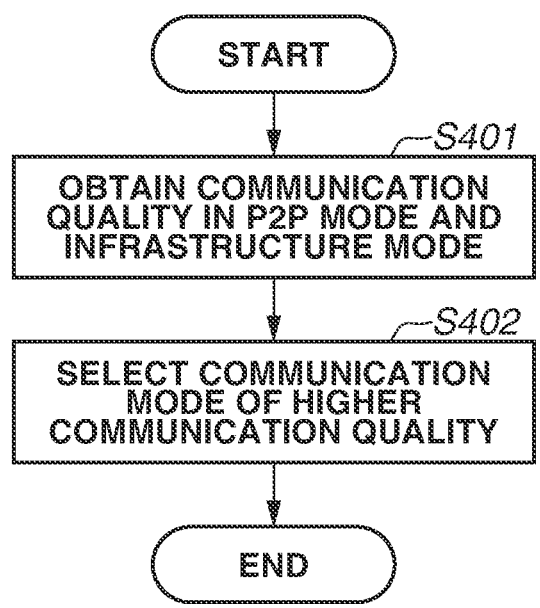
FIG. 4 is a flowchart illustrating processing performed when the source device selects a communication mode based on communication quality.

FIG. 4 illustrates a flowchart of processing implemented by the control unit 202 reading and executing the computer program stored in the storage unit 201 when the source device 101 selects a communication mode based on communication quality.

At least part of the flowchart in FIG. 4 can be implemented by hardware. In the case of hardware configuration, for example, a dedicated circuit can be automatically generated on an FPGA from the computer program for implementing the steps, by using a predetermined complier. Like an FPGA, a gate array circuit can be formed for hardware implementation. An ASIC can be used for hardware implementation.

In step S401, the control unit 202 of the source device 101 obtains communication quality with respect to the selected sink device 102 in the P2P mode and the infrastructure mode. In the P2P mode, the source device 101 can obtain the communication quality by directly receiving a wireless frame from the sink device 102 and measuring a received signal strength indicator (RSSI) and a carrier to interference and noise ratio (CINR). The RSSI indicates a received field strength. The CINR indicates the ratio of carrier power to interference and noise power. In the infrastructure mode, the source device 101 receives a wireless frame from the AP 103 and measures the RSSI and the CINR between the source device 101 and the AP 103. The source device 101 can obtain communication quality between the source device 101 and the sink device 102 via the AP 103 by obtaining information about the RSSI and the CINR between the AP 103 and the sink device 102 from the AP 103, using a management frame. The control unit 202 of the source device 101 can obtain the communication quality in the P2P mode and the infrastructure mode in step S302. In such a case, the present step is skipped.

In step S402, the control unit 202 of the source device 101 selects a communication mode of higher communication quality as the communication mode to perform mirroring in, based on the communication quality in the two communication modes. In the present step, the control unit 202 of the source device 101 uses the communication quality between the source device 101 and the AP 103 as the communication quality in the infrastructure mode. The control unit 202 of the source device 101 can compare the communication quality between the source device 101 and the AP 103 with that between the sink device 102 and the AP 103, and use the lower as the communication quality in the infrastructure mode.

After the selection of the communication mode to perform mirroring with the sink device 102 selected in step S305, the processing of flowchart of FIG. 4 ends.

Returning to FIG. 3, after step S308, the processing proceeds to step S309.

In the flowchart of FIG. 3, the control unit 202 of the source device 101 selects the communication mode to perform mirroring in after a specific sink device 102 is selected from the list of sink devices displayed as the search results. However, this is not restrictive. The control unit 202 of the source device 101 can select the communication mode to perform mirroring in before the display of the search results. Specifically, the control unit 202 of the source device 101 searches for the sink device 102 in step S302 and performs the processing of steps S306 to S308 on the detected sink device 102. The control unit 202 of the source device 101 then performs the processing of step S303. The present step can be performed in parallel with the search for the sink device 102 in step S302. FIG. 5 illustrates an example of the display in step S303. A sink device 102 determined to be detected in both the P2P mode and the infrastructure mode in step S306 is displayed with only the communication mode selected in step S308 and the communication quality thereof. After the processing of step S303, the control unit 202 of the source device 101 makes the determination of step S304. If the determination in step S304 is YES (YES in step S304), the processing of the present flowchart ends. If the determination in step S304 is NO (NO in step S304), the processing proceeds to step S305. If the determination in step S305 is NO (NO in step S305), the processing returns to step S302. If the determination in step S305 is YES (YES in step S305), the processing proceeds to step S309.

In step S309, the control unit 202 of the source device 101 performs a connection setup with the sink device 102 selected in step S305, based on the communication mode selected in step S307 or S308. If the P2P mode is selected to be used in performing mirroring with the selected sink device 102, the control unit 202 of the source device 101 performs a connection setup for establishing wireless communication compliant with the Wi-Fi Direct® standard. If the infrastructure mode is selected to be used in performing mirroring with the selected sink device 102, the control unit 202 of the source device 101 performs a connection setup for performing mirroring via the infrastructure network. Such connection setups are performed in compliance with the Wi-Fi Miracast™ R2 standard.

Initially, a case where the sink device 102 selected in the step S305 and the source device 101 perform a connection setup for establishing wireless communication compliant with the Wi-Fi Direct® standard will be described. In such a case, the connection setup uses frames such as a Beacon, a Probe Request, and a Probe Response based on the Wi-Fi Miracast™ R2 standard. Frames such as an Association Request, an Association Response, a Reassociation Request, and a Reassociation Response may be used. Frames such as a Group Owner (GO) Negotiation Request, a GO Negotiation Response, and a GO Negotiation Confirm can be used. A P2P Invitation Request and a P2P Invitation Response can be used. A Provision Discovery Request and a Provision Discovery Response can be used. The connection setup for establishing wireless communication compliant with the Wi-Fi Direct® standard will be described in detail below with reference to FIG. 6.

Next, a case when the sink device 102 selected in step S305 and the source device 101 perform a connection setup for performing mirroring via the infrastructure network will be described. In such a case, the connection setup is performed by the source device 101 transmitting a DNS packet to the infrastructure network via the connected AP 103 based on the Wi-Fi Miracast™ R2 standard. The DNS packet includes DNS records such as a SRV record and a TXT record. Each record includes either service names "display-src", which represents a source device, or "display", which represents a sink device. Details of the connection setup for performing mirroring via the infrastructure network will be described in detail below with reference to FIG. 7.

In step S310, the control unit 202 of the source device 101 performs capability negotiation with the sink device 102 selected in step S305. The Wi-Fi Miracast™ R2 standard specifies that the Real Time Streaming Protocol (RTSP) is used for capability negotiation. The RTSP is a protocol intended for streaming control. The Transmission Control Protocol (TCP) is typically used as the lower-level transport protocol. For capability negotiation, predetermined messages RTSP M1 to RTSP M4 are exchanged between the source device 101 and the selected sink device 102. By the exchanges of the RTSP messages, the source device 101 obtains capability information about the sink device 102, determines parameters to be used, and notifies the sink device 102 of the parameters. The sink device 102 sets the notified parameters. Specific examples of capability information about a screen include information such as the corresponding screen resolution, frame rate, and codec. Examples about sound include information such as the corresponding codec and sampling frequency. As a result of the capability negotiation in the present step, parameters such as the types of coding methods of image data and sound data, image resolution, and a frame rate used during mirroring between the source device 101 and the selected sink device 102 are determined. The capability information to be transmitted and received can be part of such information. For example, for image resolution, the source device 101 initially transmits an M3 message including an inquiry about the resolution of the sink device 102 to the sink device 102. The sink device 102 transmits a message including information about the resolution of the screen of the sink device 102 to the source device 101 as a response to the M3 message. Receiving the message, the source device 101 determines the resolution of the image to be transmitted to the sink device 102 based on resolution of the screen of the sink device 102.

In step S311, after the capability negotiation processing, the control unit 202 of the source device 101 establishes a session with the sink device 102 selected in step S305. According to the Wi-Fi Miracast™ R2 standard, predetermined messages RTSP M5 to M7 are exchanged between the source device 101 and the selected sink device 102 for session establishment. A port number to be used is set and a session is established by the exchange of such RTSP messages. In establishing the session, the source device 101 and the sink device 102 can set a port number to be used by another function such as content redirection. A plurality of port numbers can be set.

In step S312, after the processing up to step S311, the control unit 202 of the source device 101 streams the image data of the screen being displayed on the own apparatus and the sound data of the sound being reproduced by the own apparatus to the sink device 102 via the communication unit 206. The source device 101 starts mirroring by starting the streaming of the image data and the sound data to the sink device 102. According to the Wi-Fi Miracast™ R2 standard, the Real-time Transport Protocol (RTP) is used as the protocol for video streaming. The RTP is a protocol for transmitting and receiving multimedia data such as a moving image and sound over a network in real time. The RTP uses the User Datagram Protocol (UDP) or the TCP as the lower-level transport protocol.

With the streaming of the image data and sound data started, the processing of the present flowchart ends.

As described above, by the processing of the flowchart of FIG. 3, the source device 101 can start mirroring with the sink device 102 detected by both a search in the P2P mode and a search in the infrastructure mode without making the user select a communication mode. The user therefore does not need to make a selection operation of the communication mode in performing mirroring with the sink device 102 redundantly detected in the two communication modes. Since the automatic selection of the communication mode by the source device 101 eliminates the need for the user to have special knowledge for selecting the communication mode, a burden on the user can be reduced.

Figure 6:
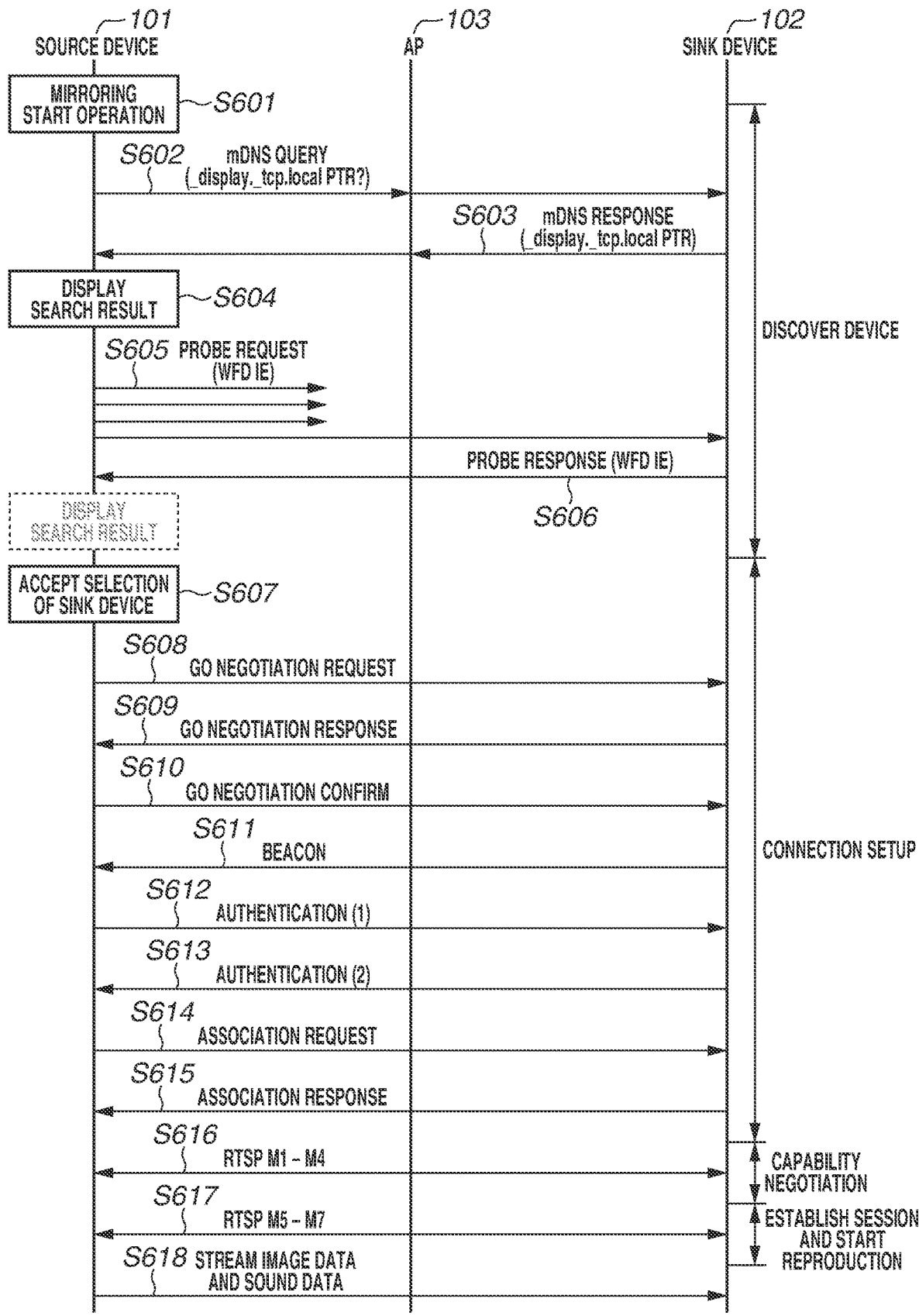
FIG. 6 is a sequence diagram illustrating processing performed when the source device performs mirroring with a detected sink device in a peer-to-peer (P2P) mode.

FIG. 6 is a sequence diagram illustrating processing performed when the source device 101 performs mirroring with the detected sink device 102 in the P2P mode.

In the present sequence, the source device 101 searches for the sink device 102 in the two communication modes in parallel by switching and performing a search for the sink device 102 in the P2P mode and a search for the sink device 102 in the infrastructure mode in a time-division manner.

In step S601, the source device 101 accepts a mirroring start operation from the user. The source device 101 searches for the sink device 102 based on the acceptance of the mirroring start operation.

A case where the source device 101 searches for the sink device 102 in the infrastructure mode will initially be described. In step S602, the source device 101 transmits an mDNS query to other communication devices participating in the infrastructure network via the AP 103. The mDNS query is a signal including information about a counter device that the source device 101 is searching for. Since the source device 101 here is searching for the sink device 102 as a counter device, the mDNS query includes the service name "display" for searching for a counter device that has a function as a sink device. Incidentally, in the case of searching for a counter device having a function as a source device, the mDNS query includes the service name "displaysrc".

Among other communication devices receiving the mDNS query via the AP 103, counter devices that match the one that is being searched for transmit an mDNS response to the apparatus transmitting the mDNS query. The source device 101 here is searching for a counter device having a function as a sink device by transmitting the mDNS query. The sink device 102 receiving the mDNS query has the function as a sink device, and thus transmits an mDNS response to the source device 101.

The source device 101 receives mDNS responses and thereby detects counter devices that can communicate in the infrastructure mode. In step S604, the source device 101 displays a search result of counter devices by listing the detected counter devices. In the present sequence, the source device 101 detects the sink device 102 and displays the sink device 102 as a detected counter device.

Next, a case where the source device 101 searches for the sink device 102 in the P2P mode will be described. In step S605, the source device 101 transmits a Probe Request including a WFD IE.

The sink device 102 receives a Probe Request including the WFD IE. In step S606, the sink device 102 transmits a Probe Response including an WFD IE as a response since the sink device 102 is a device supporting the Wi-Fi Miracast™ R2 standard. The source device 101 receives the Probe Response from the sink device 102 and thereby detects the counter device that can communicate in the P2P mode. In the present sequence, the source device 101 has already detected the sink device 102 by the search in the infrastructure mode, and thus does not update the display of the search result. If the display made by the source device 101 in step S604 includes a display of available communication modes and communication quality, the display may be updated. If a counter device is detected by the search in the P2P mode before the search in the infrastructure mode, the processing of step S604 is performed.

In step S607, the source device 101 accepts selection of the sink device 102 from the user. Since the sink device 102 is detected by both the search in the P2P mode and the search in the infrastructure mode, the source device 101 automatically selects the communication mode. In the present sequence, the communication quality of the P2P mode is higher than that of the infrastructure mode, and thus the P2P mode is selected. The source device 101 then starts a connection setup for performing mirroring with the sink device 102 in the P2P mode.

In performing mirroring in the P2P mode, the source device 101 and the sink device 102 perform mirroring via wireless communication compliant with the Wi-Fi Direct® standard. In the communication compliant with the Wi-Fi Direct® standard, the communication devices perform direct wireless communication with each other without the intervention of an AP. The role of a GO or a client (CL) is given to each of the communication devices communicating in compliance with the Wi-Fi Direct® standard. The GO refers to a group owner compliant with the Wi-Fi Direct® standard, a device playing a role in constructing a network. The CL refers to a device participating in the network constructed by the GO in wireless communication compliant with the Wi-Fi Direct® standard.

In step S608, to determine a GO between the source device 101 and the sink device 102, the source device 101 transmits a GO Negotiation Request to the sink device 102 as a role determination request. The signal includes an intent value indicating the degree of intent of the source device 101 to be a GO.

In step S609, the sink device 102 transmits a GO Negotiation Response as a response to the GO Negotiation Request. The signal includes an intent value indicating the degree of intent of the sink device 102 to be a GO. Receiving the GO Negotiation Response, the source device 101 compares the intent values of the source device 101 and the sink device 102 in magnitude, and determines the communication device having the higher intent value to be a GO. The communication device having the lower intent value is determined to be a CL.

In step S610, the source device 101 transmits a GO Negotiation Confirm including the result of comparison of the intent values to the sink device 102. In the present exemplary embodiment, suppose that the sink device 102 has an intent value higher than that of the source device 101, and the sink device 102 becomes a GO.

In step S611, the sink device 102 transmits a Beacon including a WFD IE since the sink device 102 serves as the GO in the communication compliant with the Wi-Fi Direct® standard with the source device 101.

In steps S612 and S613, the source device 101 and the sink device 102 transmit and receive authentication packets to check whether wireless communication can be established. In step S614, the source device 101 transmits an Association Request to the sink device 102. In step S615, the sink device 102 transmits an Association Response as a response to the received Association Request.

In step S616, the source device 101 performs capability negotiation with the sink device 102. In the capability negotiation, predetermined messages RTSP M1 to M4 are exchanged between the source device 101 and the sink device 102 that is the counter device. By the exchange of the RTSP messages, the source device 101 obtains capability information about the sink device 102, determines parameters to be used, and notifies the sink device 102 of the parameters. The sink device 102 sets the notified parameters.

In step S617, the source device 101 establishes a session by exchanging predetermined messages RTSP M5 to M7 with the sink device 102. In step S618, having established the session with the sink device 102, the source device 101 streams to the sink device 102 the image data of the screen being displayed on the own apparatus and the sound data of the sound being reproduced by the own apparatus.

As described above, in the sequence of FIG. 6, if the sink device 102 detected by both a search in the P2P mode and a search in the infrastructure mode is selected as a counter device to perform mirroring with, the source device 101 automatically selects the P2P mode as the communication mode. The source device 101 then performs a connection setup in the P2P mode with the sink device 102, and starts mirroring in the P2P mode.

Figure 7:
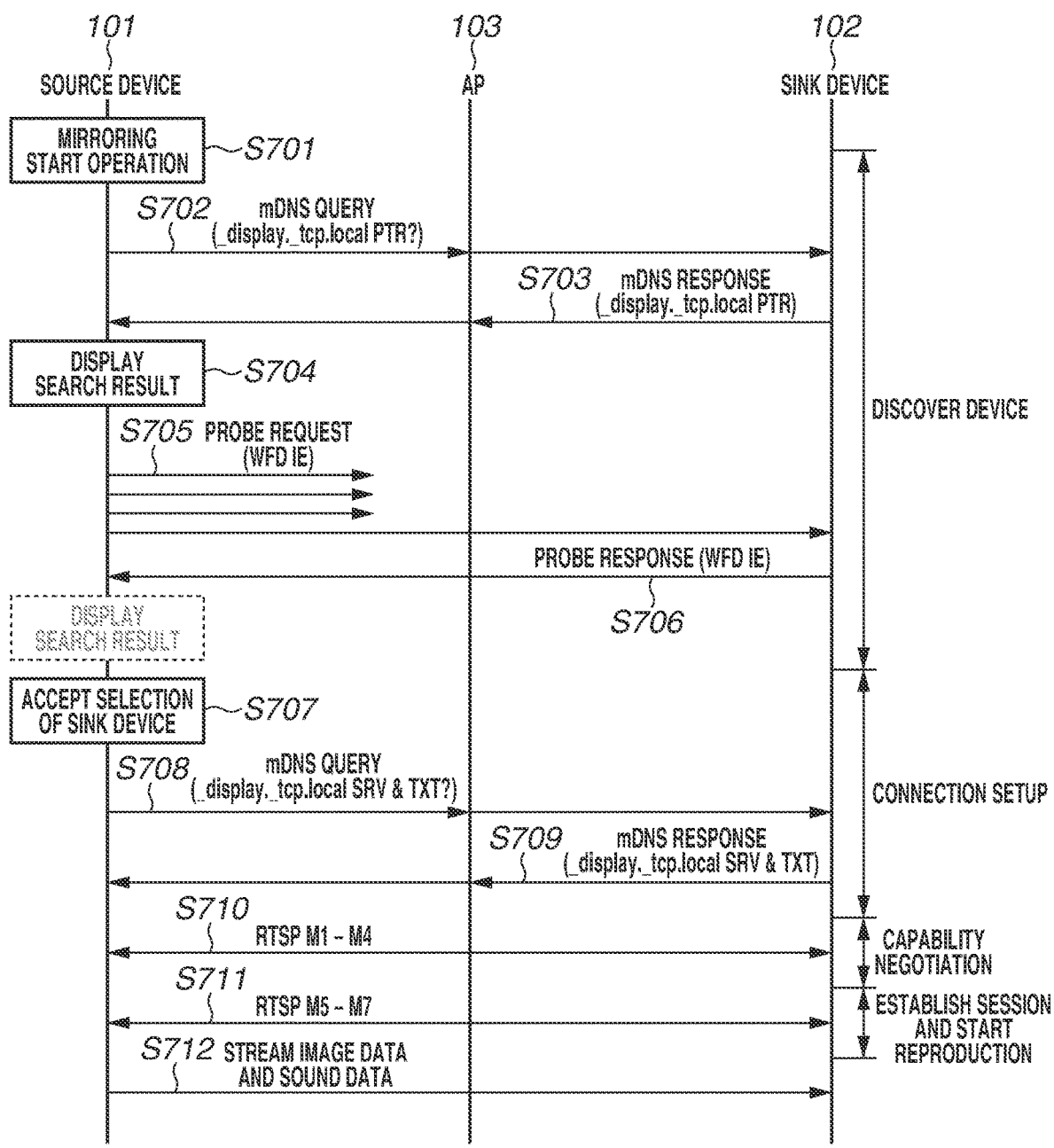
FIG. 7 is a sequence diagram illustrating processing performed when the source device performs mirroring with a detected sink device in an infrastructure mode.

FIG. 7 is a sequence diagram illustrating processing performed when the source device 101 performs mirroring with the detected sink device 102 in the infrastructure mode.

In the present sequence, the source device 101 searches for the sink device 102 in the two communication modes in parallel by switching and performing a search for the sink device 102 in the P2P mode and a search for the sink device 102 in the infrastructure mode in a time-division manner.

Steps S701 to S706 are similar to steps S601 to S606 in FIG. 6, respectively.

In step S707, the source device 101 accepts selection of the sink device 102 from the user. Since the sink device 102 is detected by both a search in the P2P mode and a search in the infrastructure mode, the source device 101 automatically selects the communication mode. In the present sequence, the communication quality of the infrastructure mode is higher than that of the P2P mode, and thus the infrastructure mode is selected. The source device 101 then starts a connection setup for performing mirroring with the sink device 102 in the infrastructure mode.

In performing mirroring in the infrastructure mode, the source device 101 and the sink device 102 perform mirroring via the infrastructure network.

In step S708, the source device 101 transmits an mDNS query to the sink device 102 via the AP 103. The mDNS query transmitted in the present step is a signal for inquiring about capability information about the sink device 102, and a port number and a hostname to be used in the communication between the source device 101 and the sink device 102. The capability information about the sink device 102 inquired in the present step is information indicating whether the sink device 102 is a sink device, a source device, or a dual role device.

In step S709, the sink device 102 receiving the mDNS query transmits an mDNS response including the capability information about the own apparatus, the port number, and the hostname to the source device 101. Receiving the mDNS response, the source device 101 completes the connection setup with the sink device 102.

Steps S710 to S712 are similar to steps S616 to S618 in FIG. 6, respectively.

As described above, in the sequence of FIG. 7, if the sink device 102 detected by both a search in the P2P mode and a search in the infrastructure mode is selected as a counter device to perform mirroring with, the source device 101 automatically selects the infrastructure mode as the communication mode. The source device 101 then performs a connection setup in the infrastructure mode with the sink device 102, and starts mirroring in the infrastructure mode.

Figure 8:
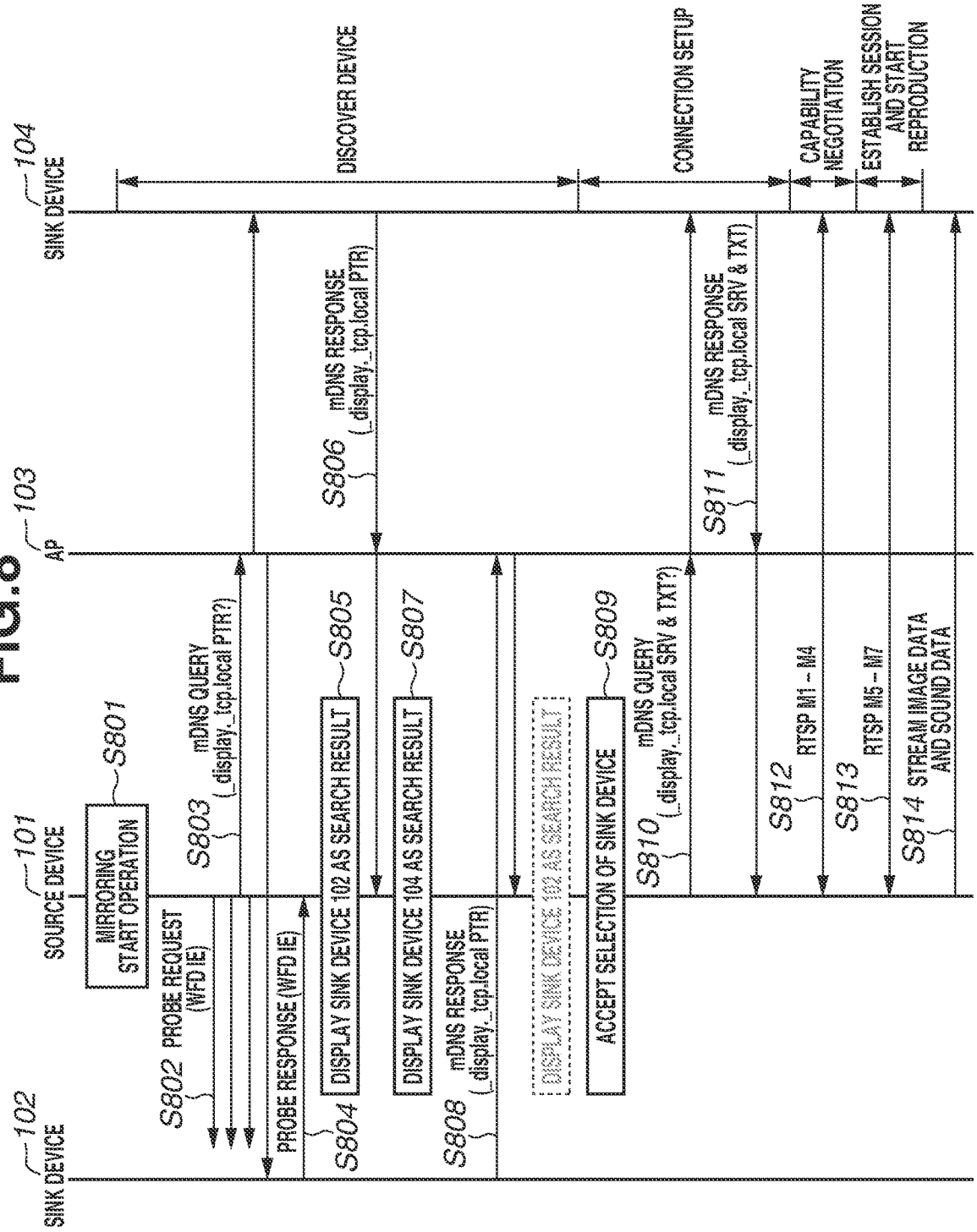
FIG. 8 is a sequence diagram illustrating processing performed when the source device simultaneously performs a search in the P2P mode and a search in the infrastructure mode, and performs mirroring in the infrastructure mode.

FIG. 8 is a sequence diagram illustrating processing performed when the source device 101 simultaneously performs a search in the P2P mode and a search in the infrastructure mode and performs mirroring in the infrastructure mode.

In the present sequence, the source device 101 searches for the sink device 102 in the two communication modes in parallel by simultaneously performing a search for the sink device 102 in the P2P mode and a search for the sink device 102 in the infrastructure mode.

In the present sequence, the source device 101 and a sink device 104 perform wireless communication on the infrastructure network via the AP 103.

In step S801, the source device 101 accepts a mirroring start operation from the user. The source device 101 searches for the sink device 102 based on the acceptance of the mirroring start operation.

In the present sequence, the source device 101 can simultaneously perform a search in the P2P mode and a search in the infrastructure mode. In steps S802 and S803, the source device 101 therefore transmits a Probe Request used for a search in the P2P mode and an mDNS query used for a search in the infrastructure mode, respectively, at the same time.

The sink device 102 is a device supporting the Wi-Fi Miracast™ R2 standard. In step S804, the sink device 102 receiving a Probe Request therefore transmits a Probe Response including a WFD IE as a response. The source device 101 receives the Probe Response from the sink device 102 and thereby detects the sink device 102 as a counter device. In step S805, the source device 101 displays the sink device 102 as a search result.

The sink device 104 has a function as a sink device. In step S806, the sink device 104 receiving the mDNS query therefore transmits an mDNS response to the source device 101. The source device 101 receives the mDNS response from the sink device 104 and thereby detects the sink device 104 as a counter device. In step S807, the source device 101 displays the sink device 104 as a search result.

The sink device 102 has a function as a sink device. In step S808, the sink device 102 receiving the mDNS query therefore transmits an mDNS response to the source device 101. The source device 101 receives the mDNS response from the sink device 102, but does not update the display since the sink device 102 has already been displayed as a counter device in step S805. The display of the search results can be updated if the search results are displayed with a display of communication modes available for communication with the counter devices and communication quality.

In step S809, the source device 101 accepts selection of the sink device 104 from the user. Since the sink device 104 is detected by a search in the infrastructure mode, the source device 101 selects the infrastructure mode as the communication mode. The source device 101 starts a connection setup for performing mirroring with the sink device 104 in the infrastructure mode.

Steps S810 to S814 are similar to steps S708 to S712 in FIG. 7, respectively. Note that the partner device that the source device 101 performs a connection setup and starts mirroring with is the sink device 104.

As described above, in the sequence of FIG. 8, the source device 101 performs a search in the P2P mode and a search in the infrastructure mode, and detects a plurality of counter devices.

In the present exemplary embodiment, if the source device 101 performs a search in the P2P mode and a search in the infrastructure mode and detects the same sink device in both the communication modes, the source device 101 automatically determines the mode for communicating with the detected sink device. This reduces a burden on the user since the user does not need to determine the mode for communicating with the sink device. In the present exemplary embodiment, the selection processing of the communication mode is performed only on a sink device 102 that is detected by both a search in the P2P mode and a search in the infrastructure mode and is selected by the user among detected sink devices 102. Since the selection processing of the communication mode is not performed on all sink devices 102 detected by both a search in the P2P mode and a search in the infrastructure mode, the source device 101 does not need to perform excessive processing. This improves the power saving performance of the source device 101.

In a second exemplary embodiment, a source device 101 selects the communication mode based on whether another communication application (hereinafter, communication app) using the infrastructure mode is running.

A network in which the source device 101 according to the present exemplary embodiment participates has a network configuration similar to that in FIG. 1 according to the first exemplary embodiment. The source device 101 according to the present exemplary embodiment has a hardware configuration similar to that in FIG. 2 according to the first exemplary embodiment. A flowchart illustrating processing performed when the source device 101 according to the present exemplary embodiment searches for a sink device 102 and performs mirroring is similar to that of FIG. 3. An example of a display screen that the source device 101 according to the present exemplary embodiment displays as a search result of the sink device 102 is similar to that in FIG. 5.

Figure 9:
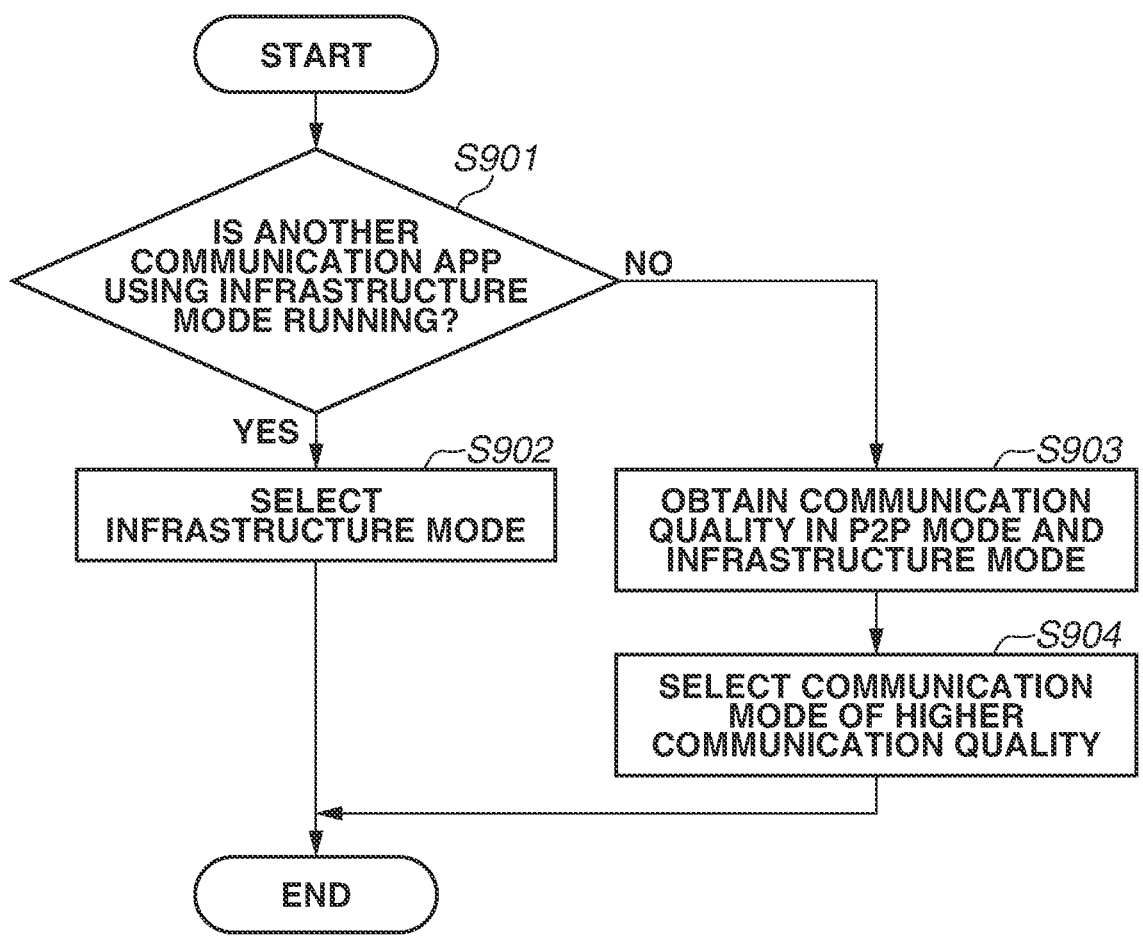
FIG. 9 is a flowchart illustrating processing performed when a source device selects the communication mode based on whether another communication application using the infrastructure mode is running.

FIG. 9 illustrates a flowchart of processing implemented by a control unit 202 reading and executing a computer program stored in a storage unit 201 when the source device 101 selects the communication mode based on whether another communication app is running.

The processing of the present flowchart corresponds to that of step S308 in FIG. 3.

In step S901, the control unit 202 of the source device 101 determines whether the apparatus is running another communication app that uses the infrastructure mode. Examples of another communication app using the infrastructure mode include an e-mail application or a web browser application. Another communication app using the infrastructure mode can be one that performs mirroring. Another communication app refers to an application other than the one that the source device 101 uses to perform the processing of the flowchart of FIG. 3. If another communication app using the infrastructure mode is determined to be running (YES in step S901), the processing proceeds to step S902. If no other communication app using the infrastructure mode is determined to be running (NO in step S901), the processing proceeds to step S903.

In step S902, the control unit 202 of the source device 101 selects the infrastructure mode as the communication mode. The processing of the present flowchart then ends. Steps S903 and S904 are similar to steps S401 and S402 in FIG. 4 according to the first exemplary embodiment, respectively.

In the present exemplary embodiment, if the source device 101 is running another communication app using the infrastructure mode, the infrastructure mode is selected as the communication mode, whereby the source device 101 is prevented from disconnecting the communication of the another communication app when performing mirroring.

In the present exemplary embodiment, the control unit 202 of the source device 101 selects the communication mode based on whether the source device 101 is running another communication app using the infrastructure mode. However, this is not restrictive. The control unit 202 of the source device 101 can select the communication mode based on whether the sink device 102 is running another communication app using the infrastructure mode. Specifically, if the sink device 102 is running another communication app using the infrastructure mode, the determination made by the control unit 202 of the source device 101 in step S901 in FIG. 9 is YES. In step S902, the control unit 202 of the source device 101 then selects the infrastructure mode as the communication mode. If the sink device 102 is not running another communication app using the infrastructure mode, the determination made by the control unit 202 of the source device 101 in step S901 in FIG. 9 is NO. The processing then proceeds to steps S903 and S904. If the sink device 102 is running another communication app using the infrastructure mode, the infrastructure mode is selected as the communication mode, whereby the sink device 102 is prevented from disconnecting the communication of the another communication app when performing mirroring.

In the present exemplary embodiment, the control unit 202 of the source device 101 can select the communication mode based on whether at least one of the source device 101 and the sink device 102 is running another communication app using the infrastructure mode. Specifically, if at least one of the source device 101 and the sink device 102 is running another communication app using the infrastructure mode, the determination made by the control unit 202 of the source device 101 in step S901 in FIG. 9 is YES. In step S902, the control unit 202 of the source device 101 then selects the infrastructure mode as the communication mode. If neither the source device 101 nor the sink device 102 is running another communication app using the infrastructure mode, the determination made by the control unit 202 of the source device 101 in step S901 is NO. The processing then proceeds to steps S903 and S904. If either the source device 101 or the sink device 102 is running another communication app using the infrastructure mode, the infrastructure mode is selected as the communication mode, whereby the device is prevented from disconnecting the communication of the another communication app when performing mirroring. If both the source device 101 and the sink device 102 are running another communication app using the infrastructure mode, the infrastructure mode is selected as the communication mode, whereby both the devices are prevented from disconnecting the communication of the another communication app when performing mirroring.

In the present exemplary embodiment, the source device 101 selects the communication mode based on whether another communication app using the infrastructure mode is running. However, this is not restrictive. The source device 101 can make the determination based on whether any communication app using the infrastructure mode, including the application used to perform the processing of FIG. 3, is running. Here, the application that the source device 101 uses to perform the processing of FIG. 3 can perform both mirroring in the P2P mode and mirroring in the infrastructure mode. If any communication app using the infrastructure mode, including the application used to perform the processing of FIG. 3, is running, the determination of the source device 101 in step S901 is YES. If any communication app using the infrastructure mode, including the application used to perform the processing of FIG. 3, is not running, the determination of the source device 101 in step S901 is NO.

A third exemplary embodiment describes an example in which the communication mode is selected depending on whether a source device and a sink device can perform a content redirection function according to the Wi-Fi® Display specification. The content redirection function is a function by which the source device transmits, to the sink device, instruction information for making the sink device obtain and display contents from a device other than the source device, and the sink device obtains and displays the contents from another device via an AP.

A source device 101 according to the present exemplary embodiment has a hardware configuration similar to that in FIG. 2 according to the first exemplary embodiment. A flowchart illustrating processing performed when the source device 101 according to the present exemplary embodiment searches for a sink device 102 and performs mirroring is similar to that of FIG. 3. An example of a display screen that the source device 101 according to the present exemplary embodiment displays as a search result of the sink device 102 is similar to that in FIG. 5.

Figure 10:
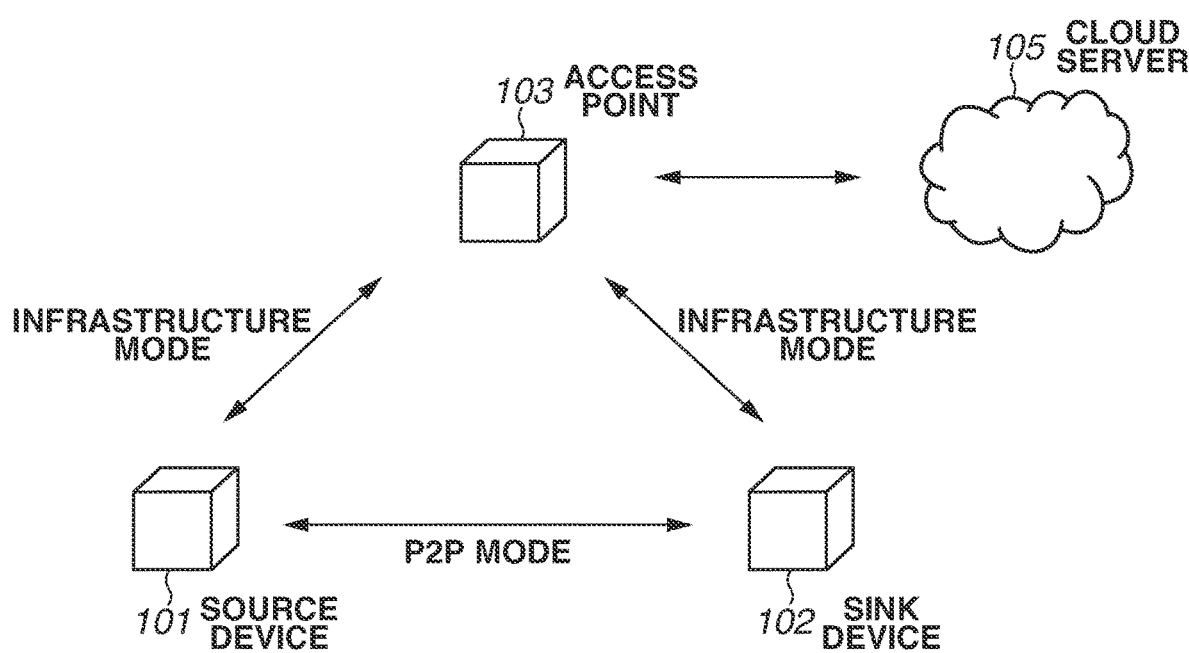
FIG. 10 is a diagram illustrating a configuration of a network in which a source device participates.

FIG. 10 is a diagram illustrating a configuration of a network in which the source device 101 according to the present exemplary embodiment participates.

The source device 101, the sink device 102, and an AP 103 are similar to those in FIG. 1. The AP 103 according to the present exemplary embodiment has a router function. The source device 101 and the sink device 102 can communicate with a cloud server 105 via the AP 103.

The source device 101 and the sink device 102 according to the present exemplary embodiment can perform content redirection. If content redirection is performed, the source device 101 can make the sink device 102 obtain contents from the cloud server 105 via the AP 103 and make the sink device 102 reproduce the obtained contents. Here, the source device 101 transmits information, such as an identifier of the contents, to the sink device 102. The sink device 102 obtains the contents from the cloud server 105 based on the information received from the source device 101. When the source device 101 and the sink device 102 are performing mirroring, the source device 101 and the sink device 102 can start and end content redirection.

Contents stored in the cloud server 105 can also be displayed on the sink device 102 by the source device 101 obtaining the contents from the cloud server 105 and performing mirroring with the sink device 102.

Figure 11:
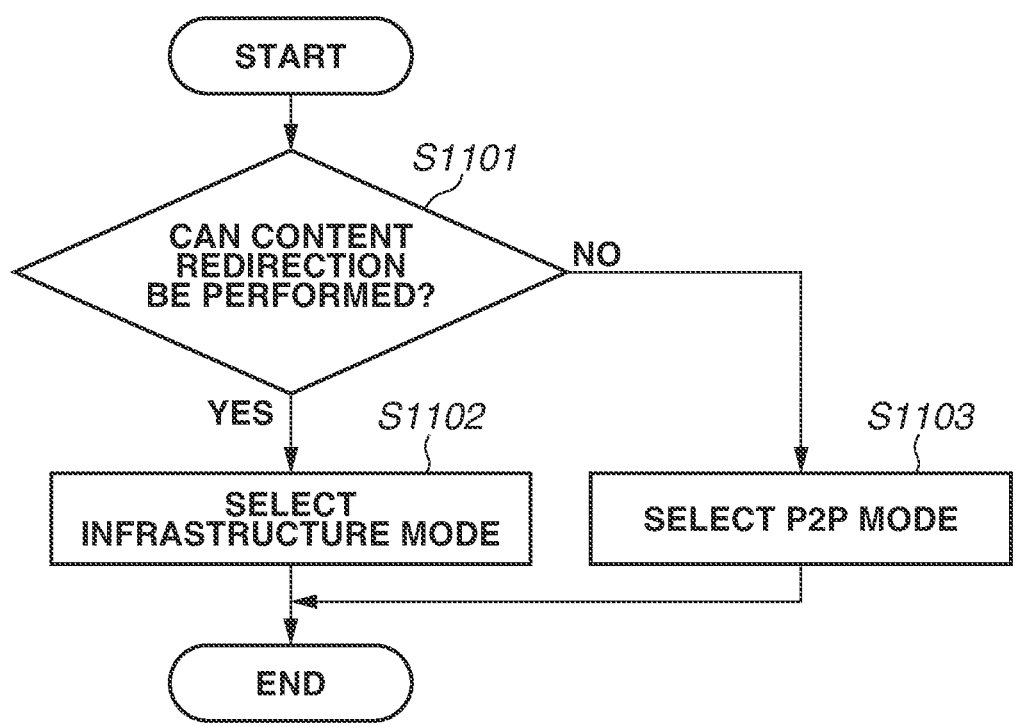
FIG. 11 is a flowchart illustrating processing performed when the source device selects the communication mode based on whether content redirection can be performed.

FIG. 11 illustrates a flowchart of processing implemented by the control unit 202 reading and executing a computer program stored in the storage unit 201 when the source device 101 selects the communication mode based on whether content redirection can be performed.

The processing of the present flowchart corresponds to step S308 in FIG. 3.

In step S1101, the control unit 202 of the source device 101 determines whether content redirection can be performed. The determination is made based on whether the source device 101 and the sink device 102 are devices supporting content redirection. If both the source device 101 and the sink device 102 support content redirection, the determination made by the control unit 202 of the source device 101 in step S1101 is YES. If at least one of the source device 101 and the sink device 102 cannot support content redirection, the determination made by the control unit 202 of the source device 101 in step S1101 is NO. The control unit 202 of the source device 101 can make the determination simply based on whether the source device 101 is a device supporting content redirection. In such a case, if the source device 101 is a device supporting content redirection, the determination made by the control unit 202 of the source device 101 in step S1101 is YES. If the source device 101 is a device that does not support content redirection, the determination made by the control unit 202 of the source device 101 in step S1101 is NO. Alternatively, if the source device 101 is a device supporting content redirection, then the control unit 202 of the source device 101 can make the determination simply based on whether the sink device 102 is a device supporting content redirection. Here, if the sink device 102 is a device supporting content redirection, the determination made by the control unit 202 of the source device 101 in step S1101 is YES. If the sink device 102 is not a device supporting content redirection, the determination made by the control unit 202 of the source device 101 in step S1101 is NO. The control unit 202 of the source device 101 can make the determination based on whether the application running on the source device 101 supports content redirection. In such a case, if the application running on the source device 101 supports content redirection, the determination made by the control unit 202 of the source device 101 in step S1101 is YES. If the application running on the source device 101 does not support content redirection, the determination made by the control unit 202 of the source device 101 in step S1101 is NO. If content redirection can be performed (YES in step S1101), the processing proceeds to step S1102. In step S1102, the control unit 202 of the source device 101 selects the infrastructure mode as the communication mode. The present flowchart then ends.

If content redirection cannot be performed (NO in step S1101), the processing proceeds to step S1103. In step S1103, the control unit 202 of the source device 101 selects the P2P mode as the communication mode. The present flowchart then ends.

If NO in step S1101, the processing can proceed to steps S401 and S402 in FIG. 4.

In the present exemplary embodiment, if content redirection can be performed, the source device 101 selects the infrastructure mode as the communication mode. In performing content redirection, the sink device 102 always communicates with the cloud server 105 via the AP 103. If content redirection is likely to be performed, the source device 101 then selects the infrastructure mode as the communication mode, so that switching of the communication modes by the sink device 102 can be suppressed when content redirection is performed. This can suppress interruption of image display due to communication disconnection caused by the sink device 102 switching the communication modes. If content redirection is unlikely to be performed, the source device 101 selects the P2P mode as the communication mode, so that that mirroring can be performed without much latency.

In the present exemplary embodiment, if content redirection is determined to be unable to be performed, the control unit 202 of the source device 101 can select a communication mode of higher communication quality. Specifically, if the determination made by the control unit 202 of the source device 101 in step S1101 is NO, the processing can proceed to steps S401 and S402 in FIG. 4.

As described above, a communication mode that suppresses interruption of image display or achieves low latency can be appropriately selected by the source device 101 selecting the communication mode based on whether content redirection can be performed.

In a fourth exemplary embodiment, a source device 101 selects the communication mode based on frequency bands used in the P2P mode and the infrastructure mode.

A network in which the source device 101 according to the present exemplary embodiment participates has a network configuration similar to that in FIG. 1 according to the first exemplary embodiment. The source device 101 according to the present exemplary embodiment has a hardware configuration similar to that in FIG. 2 according to the first exemplary embodiment. A flowchart illustrating processing performed when the source device 101 according to the present exemplary embodiment searches for a sink device 102 and performs mirroring is similar to that of FIG. 3. An example of a display screen that the source device 101 according to the present exemplary embodiment displays as a search result of the sink device 102 is similar to that in FIG. 5.

Figure 12:
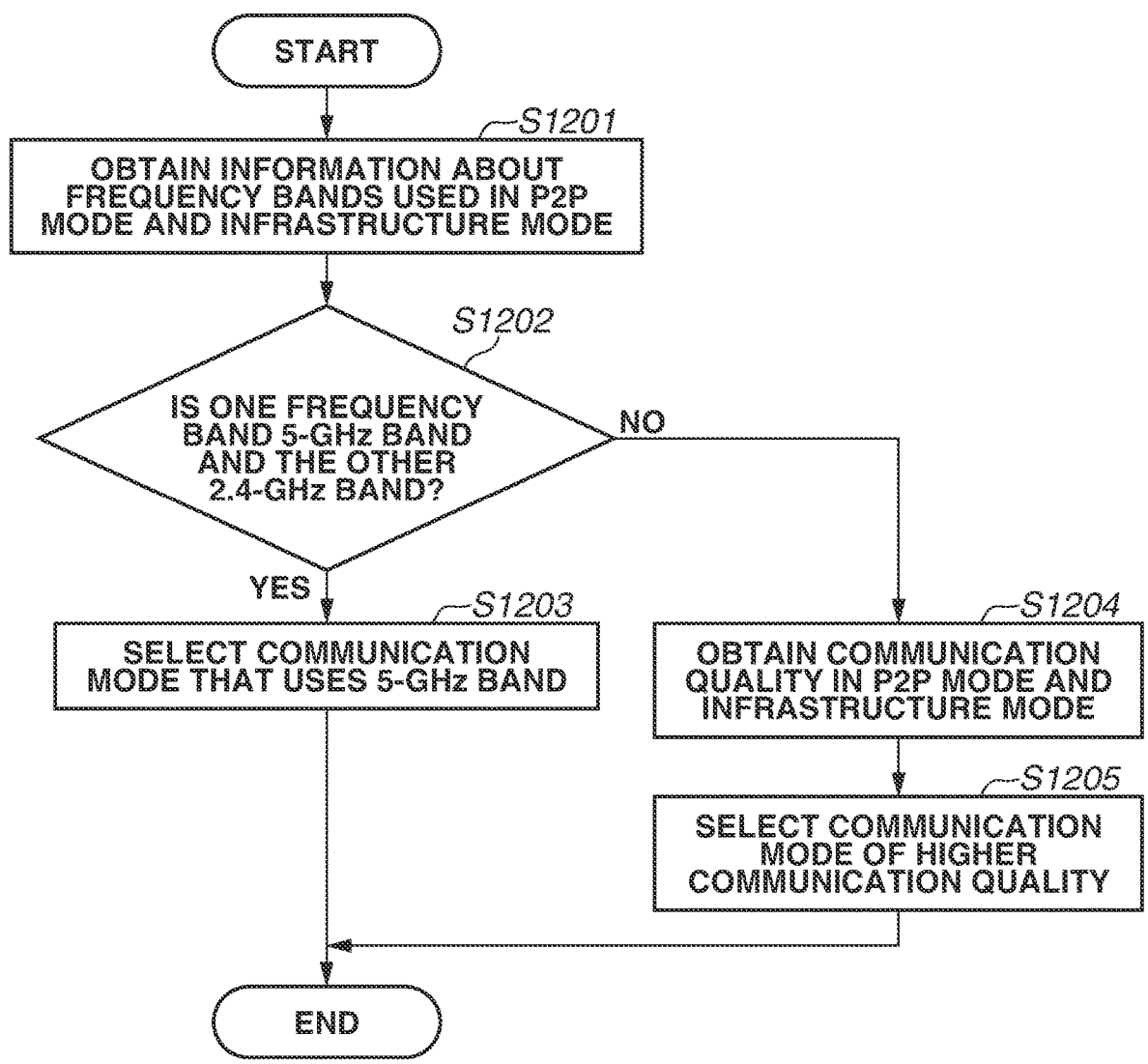
FIG. 12 is a flowchart illustrating processing performed when a source device selects the communication mode based on frequency bands available for communication.

FIG. 12 illustrates a flowchart of processing implemented by a control unit 202 reading and executing a computer program stored in a storage unit 201 when the source device 101 selects the communication mode based on frequency bands available for communication.

The processing of the present flowchart corresponds to the processing of step S308 in FIG. 3.

In step S1201, the control unit 202 of the source device 101 obtains information about frequency bands used in the P2P mode and the infrastructure mode. The information about the frequency bands used in the respective communication modes can be obtained by the source device 101 receiving wireless frames transmitted from the sink device 102 while switching the frequency channel of the communication unit 206.

In step S1202, the control unit 202 of the source device 101 determines, based on the information about the frequency bands obtained in step S1201, whether the frequency band used in either of the communication modes is a 5-GHz band and the frequency band used in the other communication mode is a 2.4-GHz band. If it is determined that the frequency band used in either of the communication modes is a 5-GHz band and the frequency band used in the other communication mode is a 2.4-GHz band (YES in step S1202), the processing proceeds to step S1203. If the frequency bands used in both the communication modes are a 5-GHz band or if neither of the communication modes uses a 5-GHz band (NO in step S1202), the processing proceeds to step S1204.

In step S1203, i.e., if the frequency band used in either of the communication modes is a 5-GHz band and the frequency band used in the other communication mode is a 2.4-GHz, the control unit 202 of the source device 101 selects the communication mode using the frequency band that is the 5-GHz band. After the processing of step S1203, the processing of the present flowchart ends.

The processing of steps S1204 and S1205 is similar to that of steps S401 and S402 in FIG. 4 according to the first exemplary embodiment, respectively.

As described above, in FIG. 12, if the frequency band used in either the communication modes is a 5-GHz band and the frequency band used in the other communication mode is a 2.4-GHz band, the source device 101 selects the communication mode using the frequency band that is the 5-GHz band. Since the 5-GHz band can achieve a data rate higher than that of the 2.4-GHz, the source device 101 can implement high-definition streaming by selecting the communication mode that uses the 5-GHz band as the frequency band.

Figure 13:
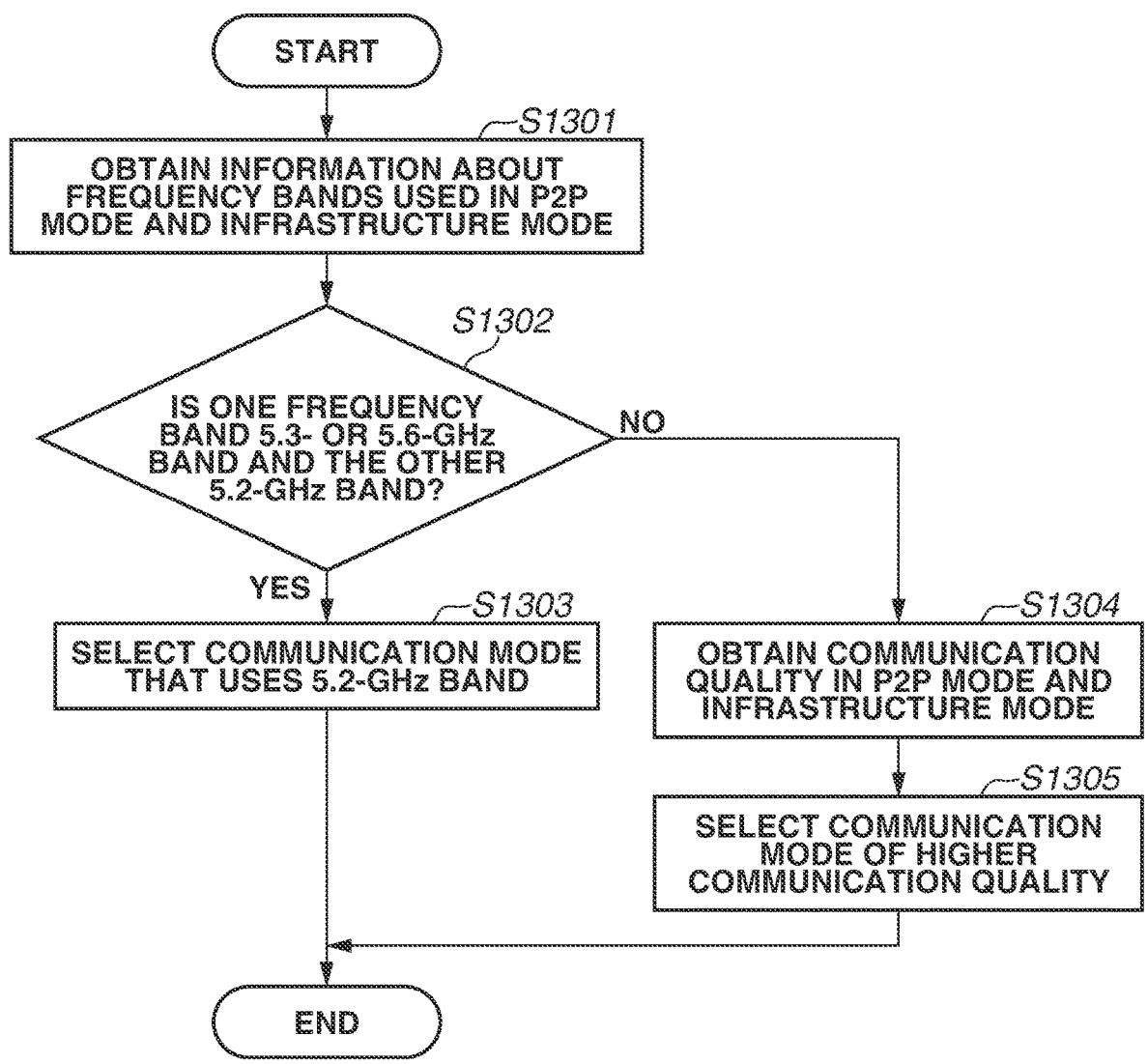
FIG. 13 is another flowchart illustrating processing performed when the source device selects the communication mode based on frequency bands available for communication.

FIG. 13 illustrates another flowchart of the processing implemented by the control unit 202 reading and executing the computer program stored in the storage unit 201 when the source device 101 selects the communication mode based on the frequency bands available for communication.

Specifically, in the present flowchart, the source device 101 can select the communication mode based on information about the frequency bands and avoid using a frequency band in which a dynamic frequency selection (DFS) function needs to be performed.

The DFS function is a mandatory function to be performed in a specific frequency band. The DFS function is a function of, before using a frequency channel included in the frequency band, performing scanning to find out whether the frequency channel is available. For example, in some countries, it is mandatory for an AP to perform the DFS function when using a 5.3-GHz band or a 5.6-GHz band.

In step S1301, the control unit 202 of the source device 101 obtains information about the frequency bands used in the P2P mode and the infrastructure mode. In the present step, the source device 101 obtains the information about the frequency bands by a method similar to that of step S1201 in FIG. 12.

In step S1302, the control unit 202 of the source device 101 determines whether the frequency band used in either of the communication modes is one in which the DFS function needs to be performed and the frequency band used in the other communication mode is one in which the DFS function does not need to be performed. In the present flowchart, the frequency band in which the DFS function needs to be performed refers to a 5.3-GHz band or a 5.6-GHz band. In the present flowchart, the frequency band in which the DFS function does not need to be performed refers to a 5.2-GHz band. If either of the communication modes uses a frequency band in which the DFS function needs to be performed and the other communication mode uses the frequency band in which the DFS function does not need to be performed (YES in step S1302), the processing proceeds to step S1303. If both the communication modes use a frequency band in which the DFS function needs to be performed or if both the communication modes use the frequency band in which the DFS function does not need to be performed (NO in step S1302), the processing proceeds to step S1304.

In step S1303, the control unit 202 of the source device 101 selects the communication mode that uses the frequency band in which the DFS function does not need to be performed (here, 5.2-GHz band). The processing of the present flowchart then ends.

The processing of steps S1304 and S1305 is similar to that of steps S401 and S402 in FIG. 4 according to the first exemplary embodiment, respectively.

The 5.2-, 5.3-, and 5.6-GHz bands are frequency bands included in the 5-GHz band in FIG. 12.

In the flowchart of FIG. 13, the control unit 202 of the source device 101 makes the determination based on whether either of the communication modes uses a frequency band in which the DFS function needs to be performed and the other communication mode uses the frequency band in which the DFS function does not need to be performed. However, this is not restrictive. The control unit 202 of the source device 101 can make the determination based on whether the infrastructure mode uses a frequency band in which the DFS function needs to be performed. If the infrastructure mode is determined to use a frequency band in which the DFS function needs to be performed, the control unit 202 of the source device 101 selects the P2P mode as the communication mode. If the infrastructure mode is determined to use the frequency band in which the DFS function does not need to be performed, the processing proceeds to steps S1304 and S1305.

As described above, in FIG. 13, if either of the communication modes uses a frequency band in which the DFS function needs to be performed and the other communication mode uses the frequency band in which the DFS function does not need to be performed, the source device 101 selects the communication mode that uses the frequency band in which the DFS function does not need to be performed. According to the present flowchart, interruption of communication occurring from scanning of a frequency band or switching of frequency channels is prevented by not performing the DFS function.

In the flowchart of FIG. 12, if both the communication modes use a frequency band that is the 5-GHz band and the determination in step S1202 is NO, the control unit 202 of the source device 101 can perform the processing of FIG. 13. In such a case, the control unit 202 of the source device 101 can skip step S1301 in FIG. 13 and start processing at step S1302.

In the flowchart of FIG. 12, if the determination in step S1202 is YES, the processing of step S1203 can be changed based on whether the communication mode using a 5-GHz frequency band uses a frequency band in which the DFS function needs to be performed. Suppose initially that either of the communication modes uses the 2.4-GHz frequency band, and the other communication mode uses a frequency band that is included in the 5-GHz band and in which the DFS function needs to be performed. In such a case, in step S1203, the control unit 202 of the source device 101 selects the communication mode that uses the 2.4-GHz frequency band. Now, suppose that either of the communication modes uses the 2.4-GHz frequency band, and the other communication mode uses the frequency band that is included in the 5-GHz band and in which the DFS function does not need to be performed. In such a case, in step S1203, the control unit 202 of the source device 101 selects the communication mode using the frequency band that is included in the 5-GHz band and in which the DFS function does not need to be performed.

In a fifth exemplary embodiment, a source device 101 provides a notification to its user based on the selected communication mode when performing mirroring.

A network in which the source device 101 according to the present exemplary embodiment participates has a network configuration similar to that in FIG. 1 according to the first exemplary embodiment. The source device 101 according to the present exemplary embodiment has a hardware configuration similar to that in FIG. 2 according to the first exemplary embodiment.

Figure 14:
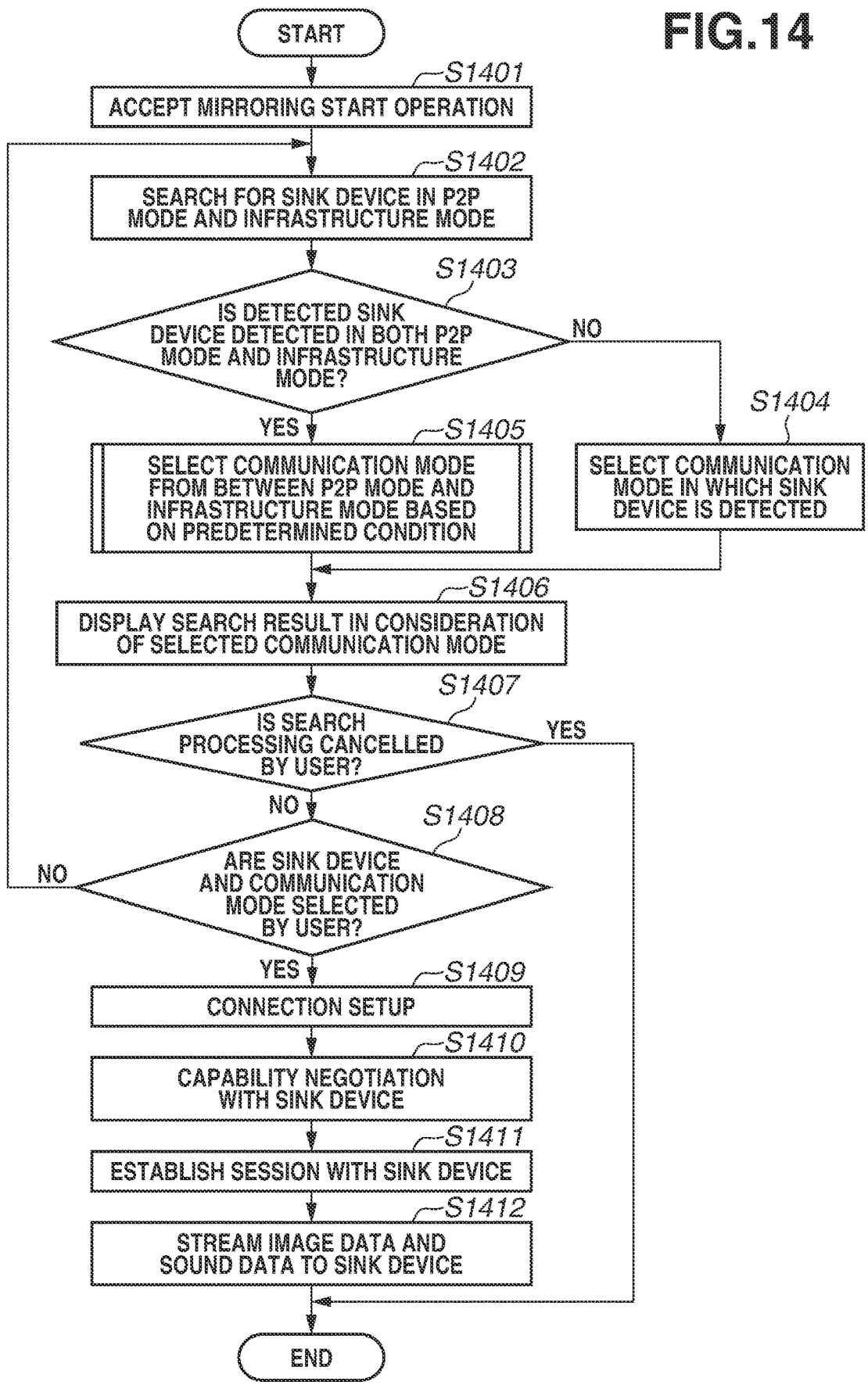
FIG. 14 is another flowchart illustrating processing performed when a source device searches for a sink device and performs mirroring.

FIG. 14 illustrates another flowchart of processing implemented by a control unit 202 reading and executing a computer program stored in a storage unit 201 when the source device 101 searches for a sink device 102 and starts mirroring.

In the present flowchart, the source device 101 searches for a counter device to perform mirroring with. However, this is not restrictive, and the sink device 102 can search for a counter device to perform mirroring with.

At least part of the flowchart in FIG. 14 can be implemented by hardware. In the case of hardware configuration, for example, a dedicated circuit can be automatically generated on an FPGA from the computer program for implementing the steps, by using a predetermined complier. Like an FPGA, a gate array circuit can be formed for hardware implementation. An ASIC can be used for hardware implementation.

The processing of the present flowchart is started based on activation of a predetermined application for performing mirroring on the source device 101. The processing can be started based on power-on of the source device 101. The processing can be started based on participation of the source device 101 in an infrastructure network constructed by an AP 103. The processing can be started based on the fact that the source device 101 and the sink device 102 establish a network compliant with the Wi-Fi Direct® standard.

In step S1401, the control unit 202 of the source device 101 initially accepts a mirroring start operation from the user. The present step is similar to step S301 in FIG. 3.

In step S1402, the control unit 202 of the source device 101 searches for a counter device (sink device 102) in the P2P mode and the infrastructure mode. The present step is similar to step S302 in FIG. 3.

In step S1403, after the search for the sink device 102 in the infrastructure mode and the P2P mode, the control unit 202 of the source device 101 determines whether the detected sink device 102 is detected in both the infrastructure mode and the P2P mode. If the detected sink device 102 is detected in both the infrastructure mode and the P2P mode (YES in step S1403), the processing proceeds to step S1405. If the detected sink device 102 is detected in just one of the infrastructure mode and the P2P mode (NO in step S1403), the processing proceeds to step S1404.

In step S1404, the control unit 202 of the source device 101 selects the communication mode in which the sink device 102 is detected, as a communication mode to be recommended to the user. The processing then proceeds to step S1406.

In step S1405, the control unit 202 of the source device 101 selects a communication mode with the sink device 102 to be recommended to the user. The present step is similar to step S308 in FIG. 3. The processing of the present step is performed according to the flowchart of FIG. 4. The control unit 202 of the source device 101 can perform the processing according to any one of the flowcharts of FIGS. 9, 11, 12, and 13. These flowcharts can be combined to select the communication mode to be recommended to the user. After step S1405, the processing proceeds to step S1406.

In step S1406, the control unit 202 of the source device 101 displays the result of search for the sink device 102 in step S1402 based on the selection of the communication mode to be recommended in step S1404 or S1405.

Figure 15:
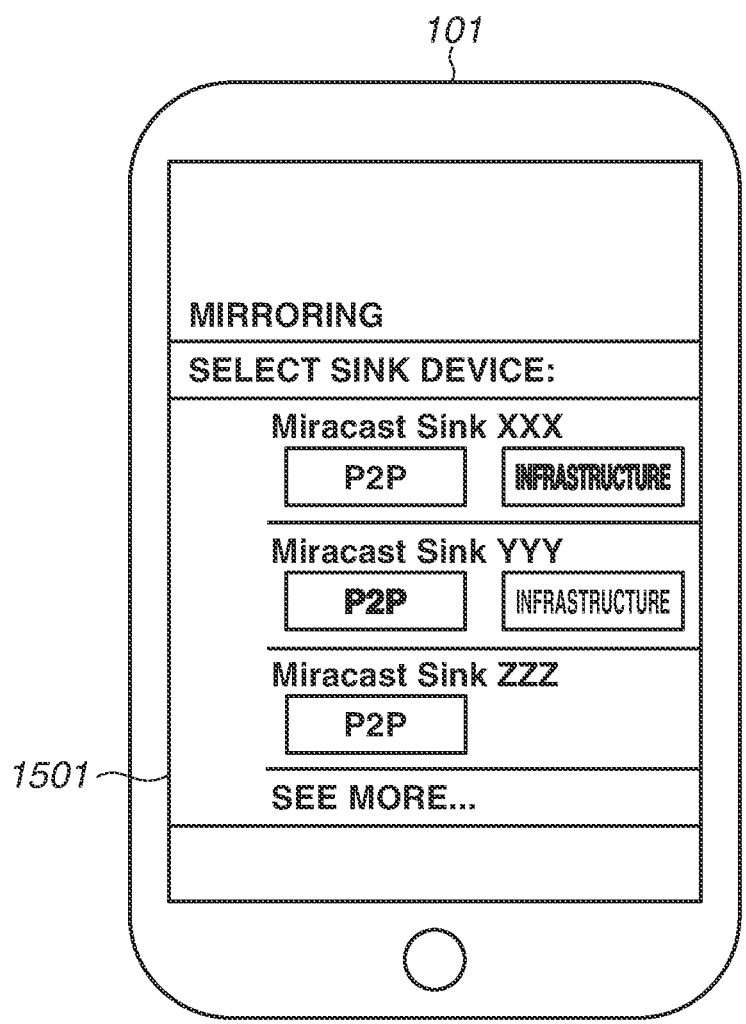
FIG. 15 is a diagram illustrating another example of a display screen that the source device displays as a result of search for a sink device.

FIG. 15 is a diagram illustrating another example of the display screen that the source device 101 displays as a result of search for the sink device 102. A search result screen 1501 displays the device names of the detected sink devices 102 as the result of search for the sink device 102 in step S1402. The search result screen 1501 also provides a display based on communication modes selected in step S1404 or S1405. For example, suppose that a sink device 102 is redundantly detected in the P2P mode and the infrastructure mode, and the infrastructure mode is selected for the sink device 102 in step S1405. For such a sink device 102, the control unit 202 of the source device 101 highlights the infrastructure mode to indicate that the infrastructure mode is recommended. For the sink device 102 detected in both the infrastructure mode and the P2P mode, the control unit 202 of the source device 101 can display only the communication mode selected in step S1405. For the sink device 102 detected in both the infrastructure mode and the P2P mode, the control unit 202 of the source device 101 can gray out the communication mode not selected in step S1405 so that the user cannot select the communication mode.

If a sink device 102 is detected in just one of the infrastructure mode and the P2P mode, the control unit 202 of the source device 101 displays only the communication mode in which the sink device 102 is detected, as a selectable communication mode. The communication mode in which the sink device 102 is not detected can be grayed out not to be selectable as the communication mode to be recommended.

In step S1407, the control unit 202 of the source device 101 determines whether the search for the sink device 102 is cancelled by the user. The present step is similar to step S304 in FIG. 3. If the search for the sink device 102 is determined to be cancelled by the user (YES in step S1407), the processing of the present flowchart ends. If the search for the sink device 102 is determined not to be cancelled by the user (NO in step S1407), the processing proceeds to step S1408.

In step S1408, the control unit 202 of the source device 101 determines whether selection processing by which the user selects the sink device 102 to perform mirroring with and the communication mode to perform the mirroring with the sink device 102 is performed. The user selects the sink device 102 to perform mirroring with and the communication mode with the sink device 102 from the search result screen 1501 displayed in step S1406. If the user selects a communication mode different from that selected in step S1405, the control unit 202 of the source device 101 can inquire of the user whether to perform communication in the selected communication mode.

The processing of steps S1409 to S1412 is similar to that of steps S309 to S312 in FIG. 3. The control unit 202 of the source device 101 performs the processing of steps S1409 to S1412 based on the communication mode selected by the user in step S1408.

In the present exemplary embodiment, for a sink device 102 detected by both a search using the P2P search function and a search using the infrastructure search function, the control unit 202 of the source device 101 selects the communication mode and displays the search result in consideration of the selected communication mode. However, this is not restrictive. After step S1402, the processing can proceed to step S303 in FIG. 3. Specifically, the control unit 202 of the source device 101 displays a sink device 102, as a search result, that is detected by at least one of a search using the P2P search function and a search using the infrastructure mode. Here, the control unit 202 of the source device 101 does not need to display whether the detected sink device 102 is detected by the P2P search function or by the infrastructure search function. The control unit 202 of the source device 101 can display only the device name of the detected sink device 102. After step S303 in FIG. 3, the processing proceeds to step S304. In step S304, if the search for the sink device 102 is determined not to be cancelled by the user (NO in step S304), the processing proceeds to step S305. In step S305, if a sink device 102 is determined to be selected by the user (YES in step S305), the processing proceeds to step S306. In step S306, if the sink device 102 selected by the user in step S305 is determined to be one detected by both a search using the infrastructure search function and a search using the P2P search function (YES in step S306), the processing proceeds to step S308. In step S308, the control unit 202 of the source device 101 selects the communication mode with the sink device 102 selected in step S305. The control unit 202 of the source device 101 provides a display for notifying the user that the communication mode selected in step S308 is recommended to be selected. The control unit 202 of the source device 101 also provides a display for making the user select which communication mode to communicate with the selected sink device 102, the infrastructure mode or the P2P mode. If the user selects the communication mode, the control unit 202 of the source device 101 performs the processing of steps S1409 to S1412 in the selected communication mode.

Since the user can thus identify the communication mode recommended for communication with the selected sink device 102, the selection of the communication mode with the sink device 102 is facilitated. The source device 101 performs the selection processing of the communication mode only on a sink device 102 that is detected by both a search in the P2P mode and a search in the infrastructure mode and is selected by the user. Since the source device 101 does not perform the selection processing on all sink devices 102 detected by both a search in the P2P mode and a search in the infrastructure mode, the source device 101 does not need to perform excessive processing. This improves the power saving performance of the source device 101.

As described above, in the present exemplary embodiment, the source device 101 automatically selects the communication mode to be recommended as that to perform mirroring in with respect to the sink device 102 detected in both the P2P mode and the infrastructure mode. The user can thus easily select the communication mode in performing mirroring with the sink device 102 detected in the two communication modes. In the present exemplary embodiment, the user can select the communication mode and can thus address situations where the user wants to perform mirroring in the communication mode other than the recommended one.

In the present exemplary embodiment, the control unit 202 of the source device 101 selects the communication mode of the sink device 102 detected by both a search using the P2P search function and a search using the infrastructure search function. However, this is not restrictive. The control unit 202 of the source device 101 can notify the user of the communication quality of each of the P2P mode and the infrastructure mode of the sink device 102. The control unit 202 of the source device 101 can also notify the user of the respective communication frequencies of the P2P and infrastructure modes of the sink device 102.

If the user selects a sink device 102, the source device 101 can inquire whether communication can be performed with the sink device 102 selected by the user in the communication mode selected in step S1405. Specifically, in step S1406, the source device 101 displays the search result as in step S303 in FIG. 3. If, in step S1408, the user selects a sink device 102, the source device 101 determines whether the selected sink device 102 is one detected by both a search using the infrastructure search function and a search using the P2P search function. If the selected sink device 102 is one detected by the searches using both the search functions, the source device 101 inquires of the user whether communication can be performed with the selected sink device 102 in the communication mode selected in step S1405. If the user selects to permit the communication with the sink device 102 in the communication mode selected in step S1405, the source device 101 performs the processing of step S1409 and the subsequent steps in the communication mode selected in step S1405. If the user selects not to communicate with the sink device 102 in the communication mode selected in step S1405, the source device 101 performs the processing of step S1406 to display the search result again. If the user selects not to communicate with the sink device 102 in the communication mode selected in step S1405, the source device 101 can perform the processing of step S1409 and the subsequent steps in the communication mode not selected in step S1405. In such a case, the processing of steps S1403 to S1405 can be performed only on the sink device 102 selected by the user in step S1408.

In the first, second, third, and fourth exemplary embodiments, the processing performed in step S308 in FIG. 3 is described to be the processing of FIG. 4, 9, 11, 12, or 13. However, this is not restrictive. The source device 101 can perform the processing of step S308 by combining the processing in FIGS. 4, 9, 11, 12, and 13.

In the first, second, third, fourth, and fifth exemplary embodiments, the source device 101 searches for the sink device 102 and starts mirroring with the detected sink device 102. However, this is not restrictive. The source device 101 can start content redirection or direct streaming with the detected sink device 102. In such a case, the source device 101 accepts a content redirection or direct streaming start operation (in step S301 in FIG. 3 or step S1401 in FIG. 14), and searches for the sink device 102 in the P2P mode and the infrastructure mode. The source device 101 establishes a session with the sink device 102 (in step S311 in FIG. 3 or step S1411 in FIG. 14), and starts content redirection or direct streaming.

In the first, second, third, fourth, and fifth exemplary embodiments, the source device 101 searches for the sink device 102 and establishes a session with the sink device 102. However, this is not restrictive. The sink device 102 can search for the source device 101 and establishes a session. Specifically, the sink device 102 can perform the processing performed by the source device 101 in steps S301 to S311 in FIG. 3. In such a case, in step S312, the sink device 102 receives image and sound streams transmitted from the source device 101. The sink device 102 can perform the processing performed by the source device 101 in steps S1401 to S1411 in FIG. 14. In such a case, in step S1412, the sink device 102 receives image and sound streams transmitted from the source device 101.

In the first, second, third, fourth, and fifth exemplary embodiments, the source device 101 searches for a counter device by using the mDNS in searching for the sink device 102 in the infrastructure mode. However, this is not restrictive. The source device 101 can use Universal Plug and Play (UPnP), which searches for a counter device by using the Simple Service Discovery Protocol (SSDP). In other words, the source device 101 can search for the sink device 102 by using a communication standard for searching for a service provided by another communication device via the AP 103. When the source device 101 searches for the sink device 102 in the P2P mode, the source device 101 searches for the sink device 102 in compliance with the Wi-Fi Direct® standard and establishes wireless communication with the detected sink device 102. However, this is not restrictive. The source device 101 can search for the sink device 102 in compliance with other wireless communication standards capable of wireless communication without the intervention of an AP, like Bluetooth® and ZigBee®, and establish wireless communication with the detected sink device 102.

In the first, second, third, fourth, and fifth exemplary embodiments, when the source device 101 searches for the sink device 102 in the P2P mode, the source device 101 searches for a sink device 102 compliant with the Wi-Fi Miracast™ R2 standard. However, this is not restrictive. The source device 101 can search for a sink device 102 compliant with the Wi-Fi Miracast™ standards including the Wi-Fi Miracast™ R1 standard.

In the first, second, third, fourth, and fifth exemplary embodiments, if the source device 101 is communicating with the AP 103 and performs communication with the detected sink device 102 in the P2P mode, the source device 101 can notify the user that the communication with the AP 103 will be disconnected. The source device 101 can inquire of the user whether the communication with the AP 103 can be disconnected. If the user selects to permit the disconnection of the communication with the AP 103, the source device 101 disconnects the communication with the AP 103 and communicates with the sink device 102 in the P2P mode. If the user selects not to disconnect the communication with the AP 103 and the sink device 102 is also detected by a search in the infrastructure mode, the source device 101 communicates with the sink device 102 in the infrastructure mode. If the user selects not to disconnect the communication with the AP 103 and the sink device 102 is not detected by a search in the infrastructure mode, the source device 101 prompts the user to select another sink device.

In the first, second, third, fourth, and fifth exemplary embodiments, if the source device 101 is communicating with the AP 103 and performs communication with the detected sink device 102 in the P2P mode, the source device 101 can automatically communicate with the AP 103 again after the communication with the sink device 102 is disconnected. If the sink device 102 is communicating with the AP 103 and is requested by the source device 101 to perform communication in the P2P mode, the sink device 102 can automatically communicate with the AP 103 again after the communication with the source device 101 is disconnected.

At least part or all of the flowcharts of the source device 101 in FIGS. 3, 4, 9, 11, 12, 13, and 14 can be implemented by hardware. In the case of hardware configuration, for example, a dedicated circuit can be generated and used on an FPGA from the computer programs for implementing the steps, by using a predetermined complier. Like an FPGA, a gate array circuit can be formed for hardware implementation. An ASIC can be used for hardware implementation. The same applies to the sequence diagrams in FIGS. 6, 7, and 8.

The steps of the flowcharts in FIGS. 3, 4, 9, 11, 12, 13, and 14 and the sequence diagrams in FIGS. 6, 7, and 8 can be performed by an unillustrated plurality of CPUs or apparatuses in a distributed manner.

While the exemplary embodiments have been described in detail above, exemplary embodiments of the present disclosure can be carried out, for example, in forms such as a system, an apparatus, a method, a program, and a recording medium (storage medium). Specifically, an exemplary embodiment of the present disclosure can be applied to a system including a plurality of devices (such as a host computer, an interface device, an imaging apparatus, and a web application). An exemplary embodiment of the present disclosure can be applied to an apparatus including a single device.

An exemplary embodiment of the present disclosure can be implemented by processing for supplying a program for implementing one or more functions of the foregoing exemplary embodiments to a system or an apparatus via a network or a storage medium, and reading and executing the program by one or more processors of a computer of the system or the apparatus. An exemplary embodiment of the present disclosure can be implemented by a circuit for implementing one or more functions (for example, an ASIC).

According to an exemplary embodiment of the present disclosure, processing load of a communication device can be reduced by the communication device performing processing related to selection of a method for communicating with another communication device according to the fact that the another communication device selected by a user is one detected by a plurality of search methods.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-248477, filed Dec. 25, 2017, which is hereby incorporated by reference herein in its entirety.

What is claimed is:

1. A communication device comprising:
   one or more processors; and
   one or more memories including instructions that, when executed by the one or more processors, cause the communication device to:
   execute a first search process to search, without intervention of a constructing device configured to construct a wireless network, for another communication device to communicate by first communication which is direct communication with another communication device;
   execute a second search process to search, via the constructing device, for another communication device to communicate second communication which is communication via the constructing device with another communication device;
   accept a user operation for selecting another communication device to communicate by the first communication or the second communication from among other communication devices detected by at least the first search process or the second search process; and
   select, after accepting the user operation, whether to communicate with the another communication device by the first communication or the second communication based on one or more of a state of communication with the another communication device, information about the communication device, and information about the another communication device, in response to the another communication device selected by the user operation being one redundantly detected by the first search process and the second search process.

2. The communication device according to claim 1, wherein the communication device selects whether to communicate with the selected another communication device by the first communication or the second communication having higher quality of communication based on quality of communication with the selected another communication device by the first communication and quality of communication with the selected another communication device by the second communication.

3. The communication device according to claim 1, wherein the communication device selects whether to communicate with the selected another communication device by the first communication or the second communication based on a first frequency band used for communication with the another communication device and a second frequency band used for communication with the another communication device.

4. The communication device according to claim 3, wherein in a case where the frequency band used for either the first communication or the second communication is a 5-GHz band and the frequency band used for the other communication is a 2.4-GHz band, select to communicate with the selected another communication device by the communication using the frequency band that is the 5-GHz band.

5. The communication device according to claim 3, wherein, in a case where the frequency band used for either the first communication or the second communication is a 5.2-GHz band included in a 5-GHz band and the frequency band used for the other communication is a 5.3-GHz band or 5.6-GHz band included in the 5-GHz band, select to communicate with the selected another communication device by the communication using the frequency band that is the 5.2-GHz band.

6. The communication device according to claim 1, wherein in a case where the communication device is already running an application configured to communicate by the first communication or the second communication, select to communicate with the selected another communication device by the communication corresponding to the running application.

7. The communication device according to claim 1, wherein in a case where the communication device makes the selected another communication device obtain contents stored in an external apparatus different from the selected another communication device by transmitting related information about the contents, select to communicate with the selected another communication device by the second communication.

8. The communication device according to claim 1, wherein in a case where the selected another communication device can obtain contents stored in an external apparatus different from the selected another communication device by receiving related information about the contents from the communication device, select to communicate with the selected another communication device by the second communication.

9. The communication device according to claim 1, wherein the execution of the instructions further causes the communication device to:
transmit at least image data of a screen being displayed on the communication device or sound data of sound being reproduced by the communication device to the selected another communication device by the selected communication.

10. The communication device according to claim 1, wherein the communication device communicate with the selected another communication device by the second communication via an access point constructing an infrastructure network compliant with an IEEE 802.11 series standard.

11. The communication device according to claim 1, wherein the communication device communicate with the selected another communication device by first communication complied with a Wi-Fi Direct standard.

12. The communication device according to claim 1, wherein the first search process is performed by transmitting a Probe Request including a Wi-Fi Display Information Element (WFD IE) in compliance with a Wi-Fi Miracast Release 2 (R2) standard.

13. The communication device according to claim 1, wherein the second search process is performed by using a multicast Domain Name System (mDNS).

14. The communication device according to claim 1, wherein the execution of the instructions further causes the communication device to:
notify the selected one of the first communication or the second communication.

15. A method for controlling a communication device, comprising:

executing searching as a first search process, without intervention of a constructing device configured to construct a wireless network, for another communication device to perform direct wireless communication by first communication which is direct communication with another communication device;
executing searching as a second search process, via the constructing device, for another communication device to communicate by second communication which is communication via the constructing device with another communication device;
accepting a user operation for selecting another communication device to communicate by the direct wireless communication or by the second communication from among other communication devices detected by at least one of the first search process or the second search process; and
selecting, after accepting the user operation, whether to perform communication with the another communication device by the first communication or the second communication based on one or more of a state of communication with the another communication device, information about the communication device, or information about the another communication device, in response to the another communication device selected by the user operation being one redundantly detected by both the first search process and the second search process.

16. A non-transitory computer-readable storage medium storing a program for causing a computer to execute a method for controlling a communication device, the method comprising:
executing searching as a first search process, without intervention of a constructing device configured to construct a wireless network, for another communication device to perform direct wireless communication by first communication which is direct communication with another communication device;
executing searching as a second search process, via the constructing device, for another communication device to communicate by second communication which is communication via the constructing device with another communication device;
accepting a user operation for selecting another communication device to communicate by the direct wireless communication or by the second communication from among other communication devices detected by the first search process or the second search process; and
selecting, after accepting the user operation, whether to perform communication with the another communication device by the first communication or the second communication based on one or more of a state of communication with the another communication device, information about the communication device, or information about the another communication device, in response to the another communication device selected by the user operation being one redundantly detected by the first search process and the second search process.

17. The communication device according to claim 1, wherein the communication device communicates with the selected another communication device by the selected communication.

* * * * *